United States Patent
Kampati et al.

(10) Patent No.: US 11,943,209 B2
(45) Date of Patent: Mar. 26, 2024

(54) REKEYING A SECURITY ASSOCIATION SA

(71) Applicant: HUAWEI TECHNOLOGIES CO., LTD., Guangdong (CN)

(72) Inventors: Sandeep Kampati, Bangalore (IN); Bharath Soma Satya Meduri, Bangalore (IN); Dharmanandana Reddy Pothula, Bangalore (IN); De Sheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 213 days.

(21) Appl. No.: 17/321,499

(22) Filed: May 17, 2021

(65) Prior Publication Data
US 2021/0273928 A1 Sep. 2, 2021

Related U.S. Application Data

(63) Continuation of application No. PCT/CN2019/117884, filed on Nov. 13, 2019.

(30) Foreign Application Priority Data

Nov. 15, 2018 (IN) .............................. 201831042955

(51) Int. Cl.
*H04L 9/40* (2022.01)
(52) U.S. Cl.
CPC ........ *H04L 63/061* (2013.01); *H04L 63/0245* (2013.01); *H04L 63/029* (2013.01); *H04L 63/0435* (2013.01)

(58) Field of Classification Search
CPC . H04L 63/061; H04L 63/0245; H04L 63/029; H04L 63/0435; H04L 63/164; H04L 9/0891
See application file for complete search history.

(56) References Cited

U.S. PATENT DOCUMENTS 9,021,577 B2   4/2015 Song et al.
9,516,065 B2  12/2016 Suram et al.
(Continued)

FOREIGN PATENT DOCUMENTS

CN    101110672 A    1/2008
CN    101502040 A    8/2009
(Continued)

OTHER PUBLICATIONS

C. Kaufman et al, RFC7296-Internet Key Exchange Protocol Version 2 (IKEv2), Oct. 2014, Internet Engineering Task Force (IETF) (Year: 2014).*
(Continued)

*Primary Examiner* — Khalil Naghdali
(74) *Attorney, Agent, or Firm* — James Harrison

(57) ABSTRACT

In the IKE or IPSec SA rekeying, whether the rekey exchange includes the cryptographic suite in the payload depends on whether the cryptographic suite used in the old SA is changed on both ends, e.g., the initiator and the responder. If the cryptographic suite is not changed, then the rekey exchange does not include the cryptographic suite. Additionally, in the IPSec SA rekey, if the flowing information is not changed in either end, the rekey exchange further does not include the Traffic Selector (TS). As such, the size of the payload is decreased, which saves bandwidth, more processing time and power in the course of the IKE SA or the IPSec SA rekey.

34 Claims, 21 Drawing Sheets

(56) References Cited

U.S. PATENT DOCUMENTS

| | | | |
|---|---|---|---|
| 10,798,071 B2* | 10/2020 | Kariyanahalli | H04L 63/20 |
| 2003/0031151 A1 | 2/2003 | Sharma et al. | |
| 2006/0104308 A1 | 5/2006 | Pinkerton et al. | |
| 2006/0167894 A1* | 7/2006 | Wunner | H04L 63/08 |
| 2006/0173968 A1* | 8/2006 | Vaarala | H04L 9/0841 |
| | | | 709/227 |
| 2008/0137863 A1 | 6/2008 | Thomas | |
| 2010/0281251 A1* | 11/2010 | Arauz Rosado | H04L 63/20 |
| | | | 713/161 |
| 2012/0266209 A1* | 10/2012 | Gooding | H04L 63/20 |
| | | | 726/1 |
| 2013/0263249 A1 | 10/2013 | Song et al. | |
| 2016/0080424 A1* | 3/2016 | Hasegawa | H04L 63/205 |
| | | | 726/1 |
| 2016/0182463 A1 | 6/2016 | Suram et al. | |
| 2018/0294964 A1 | 10/2018 | Chen et al. | |
| 2021/0351933 A1* | 11/2021 | Duda | H04L 9/3263 |

FOREIGN PATENT DOCUMENTS

| | | |
|---|---|---|
| CN | 102420740 A | 4/2012 |
| CN | 102447690 A | 5/2012 |
| CN | 108353076 A | 7/2018 |
| JP | 2005253061 A | 9/2005 |
| JP | 2015515210 A | 5/2015 |
| JP | 2017028740 A | 2/2017 |
| KR | 101068359 B1 | 9/2011 |
| WO | 2013149041 A1 | 10/2013 |
| WO | 2018032747 A1 | 2/2018 |

OTHER PUBLICATIONS

Giuliano et al., 2012 IEEE, "Security Implementation in Heterogeneous Networks with Long Delay Channel", pp. 1-6 (Year: 2012).*

Yasuyuki Ichikawa, et. al. A Study on the IPsec Negotiation method, The Institute of Electronics, Information and Communication Engineers; 2008 Papers of Lectures at General Convention Communication 2, Japan, The Institute of Electronics, Information and Communication Engineers, Mar. 5, 2008, 5 pages (with an English abstract).

C.Hohendorf University of Duisburg-Essen E.Unurkhaan Mongolian University T.Dreibholz University of Duisburg-Essen: "Secure SCTP; draft-hohendorf-secure-sctp-12.txt", Jul. 3, 2011 (Jul. 3, 2011), total:40pages.

S.Kampati M.Bharath W.Pan Huawei :IKEv2 Optional SAa&TS Payloads in Child Exchange DRAFT-KAMPATI-IPSECME-IKEU2-SA-TS-PAYLOADS-OPT-03; Mar. 7, 2021,total:12pages.

S.Kampati M.Bharath W.Pan Huawei: IKEv2 Optional SA&TS Payloads in Child Exchange draft-kampati-ipsecme-ikev2-sa-ts-payloads-opt-02,total:12pages.

Kaufman: Internet Key Exchange(IKEv2) Protocol IETF RFC 4306 Dec. 2005 XP055125090 total:99pages.

Request for Comments: 7296, C. Kaufman et al, Internet Key Exchange Protocol Version 2 (IKEv2), Internet Engineering Task Force (IETF), Oct. 2014, total 142 pages.

Cisco, IKEv2 RFC 5996 Compliance, IPSec Reference, StarOS Release 21.1, Jan. 26, 2017, total 6 pages.

Request for Comments: 7815, T. Kivinen et al, Minimal Internet Key Exchange Version 2 (IKEv2) Initiator Implementation, Internet Engineering Task Force (IETF), Mar. 2016, total 41 pages.

Cisco, Crypto Template IKEv2-Vendor Payload Configuration Mode Commands, Command Line Interface Reference, Modes C-D, StarOS Release 21.6, Nov. 29, 2018, total 8 pages.

Apple Inc., Configuration Profile Reference, May 3, 2019, total 123 pages.

Request for Comments: 4718, P. Eronen et al, IKEv2 Clarifications and Implementation Guidelines, Network Working Group, Oct. 2006, total 58 pages.

Request for Comments: 5996, C. Kaufman et al, Internet Key Exchange Protocol Version 2 (IKEv2), Internet Engineering Task Force (IETF), Sep. 2010, total 138 pages.

Ryan Cooper et al, IBM i 7.2 Technical Overview with Technology Refresh Updates, International Technical Support Organization, Oct. 2016, total 520 pages.

* cited by examiner

```
SA Payload size (44)
    |
    +---- Proposal #1 ( Proto ID = ESP(3), SPI size = 8,
    |                   4 transforms,     SPI = 0x052357bb )
    |
    |     +--- Transform ENCR ( Name = ENCR_DES )
    |     |                                            No attribute is added
    |     +--- Transform ENCR ( Name = PRF_HMAC_MD5)
    |     |
    |     +--- Transform INTEG ( Name = AUTH_HMAC_SHA1_96 )
    |     +--- Transform ESN ( Name = 768-bit MODP group)

A Payload  size (48)
    |
    +---- Proposal #1 ( Proto ID = ESP(3), SPI size = 8,
    |                   4 transforms,     SPI = 0x052357bb )
    |
    |     +--- Transform ENCR ( Name = ENCR_AES_CBC )
    |     |     +--- Attribute ( Key Length = 128 )    In case of AES key length
    |     |                                            attribute is added so SA
    |     +--- Transform ENCR ( Name = PRF_HMAC_MD5)   payload size is 48
    |     |
    |     +--- Transform INTEG ( Name = AUTH_HMAC_SHA1_96 )
    |     +--- Transform ESN ( Name = 768-bit MODP group)

SA Payload
    |
    +---- Proposal #1 ( Proto ID = ESP(3), SPI size = 8,
    |                   4 transforms,     SPI = 0x052357bb )
    |
    |     +--- Transform ENCR ( Name = ENCR_AES_CBC )
    |     |     +--- Attribute ( Key Length = 128 )              Suit 1
    |     |
    |     +--- Transform ENCR ( Name = PRF_HMAC_MD5 )
    |     |
    |     +--- Transform INTEG ( Name = AUTH_HMAC_SHA1_96 )
    |     +--- Transform ESN ( Name = 768-bit MODP group)
    |
    +---- Proposal #2 ( Proto ID = ESP(3), SPI size = 8,
    |                   4 transforms,     SPI = 0x35a1d6f2 )
    |
    |     +--- Transform ENCR ( Name = AES-GCM with a 8 octet ICV )
    |     |     +--- Attribute ( Key Length = 128 )              Suit 2
    |     |
    |     +--- Transform ENCR ( Name = PRF_HMAC_MD5)
    |     |
    |     +--- Transform INTEG ( Name = AUTH_HMAC_SHA1_96 )
    |     +--- Transform ESN ( Name = 768-bit MODP group)
    |
```

Figure 1A

NEW_SPI for IKE

Type Payload: Notify (41)
  Next payload: Notify (41)
  0... .... = critical Bit: Not critical
  Payload length: 12
  Protocol ID: IKE (1)
  SPI Size: 8
  Notify Message Type: NEW_SPI
  SPI : 1742f7f0 1420fa13
  Notification Data: <MISSING>

Figure 7C

```
IKE Lightweight SA payload

SA Payload
     |
     +---- Proposal #1 ( Proto ID = IKE (1), SPI size = 8,
                         0 transforms,    SPI = 0x052357bb154357cc )
```

Figure 7D

```
                     1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Payload  |C|  RESERVED   |         Payload Length        |
+-+-+-+-+-+-+-+-+-+-+-+-+-+-+-+-+-+-+-+-+-+-+-+-+-+-+-+-+-+-+-+-+
|  Protocol ID  |   SPI Size    |      Notify Message Type      |
+-+-+-+-+-+-+-+-+-+-+-+-+-+-+-+-+-+-+-+-+-+-+-+-+-+-+-+-+-+-+-+-+
|                                                               |
~              Security Parameter Index  SPI                    ~
|                                                               |
+-+-+-+-+-+-+-+-+-+-+-+-+-+-+-+-+-+-+-+-+-+-+-+-+-+-+-+-+-+-+-+-+
```

Figure 7E

NEW_SPI for AH

```
⊟ Type Payload: Notify (41)
    Next payload: Notify (41)
    0... .... = Critical Bit: Not Critical
    Payload length: 12
    Protocol ID: AH (2)
    SPI Size: 4
    Notify Message Type: NEW_SPI
    SPI : 1742f7f0
    Notification DATA: <MISSING>
```

Figure 10C

IPSEC "Lightweight SA" payload

```
SA Payload
    :
    +---- Proposal #1 ( Proto ID = ESP(3) or AH (2), SPI size = 4,
                       0 transforms,      SPI = 0x052357bb )
IPSEC "Lightweight SA" payload
!
In Case of  AH & ESP support (SA Bundling )
   SA Payload
       :
       +---- Proposal #1 ( Proto ID = AH(2), SPI size = 4,
       :                   0 transforms,      SPI = 0x052357bb )
       :
       :
       +---- Proposal #1 ( Proto ID = ESP(3), SPI size = 4,
                           0 transforms,      SPI = 0x35a1d6f2 )
```

Figure 10D

REKEYING A SECURITY ASSOCIATION SA

CROSS-REFERENCE TO RELATED APPLICATIONS

This application is a continuation of International Application No. PCT/CN2019/117884, filed on Nov. 13, 2019, which claims priority to Indian Patent Application No. IN201831042955, filed on Nov. 15, 2018, both of which are hereby incorporated by reference in its entirety.

TECHNICAL FIELD

The disclosure herein relates generally to telecommunications, more particularly to Internet security protocols, and even more particularly to methods, devices, system for rekeying a security association, such as for a mobile device with limited power, bandwidth and/or processing capabilities.

BACKGROUND

Internet Key Exchange Version-2 (IKEv2) is a protocol defined by RFC 7296, which is incorporated by reference for all purposes as if fully set forth herein except where contrary to the explicit disclosure herein. Terms used herein have the meaning given by RFC 7296 except where contrary to the explicit disclosure herein.

IKEv2 is used to set up a security association (SA) in the IPSec protocol suite. A security association, SA, can be an IKE tunnel or IPsec tunnel. Internet Protocol Security (IPsec) is a network protocol suite that authenticates and encrypts the packets of data sent over a network.

IKE message flow comprises a request followed by a response. It is the responsibility of the requester to ensure reliability. If the response is not received within a timeout interval, the requester needs to retransmit the request (or abandon the connection). The first request/response message pair between the requestor and a responder of an IKE session (IKE_SA_INIT) negotiates security parameters for the IKE_SA, sends nonce, and sends Diffie-Hellman values. The second request/response message pair (IKE_AUTH) transmits identities, proves knowledge of the secrets corresponding to the two identities, and sets up a SA for the first (and often only) Authentication Header (AH) and/or Encapsulating Security Payload (ESP) CHILD_SA.

IKE Rekey procedure in IKEv2 is defined in RFC 7296, which is incorporated by reference for all purposes as if fully set forth herein except where contrary to the explicit disclosure herein. Terms used herein have the meaning given by RFC 7296 except where contrary to the explicit disclosure herein.

Rekeying is, by definition, the creation of new SA to take the place of expiring SA before the SA expires.

For example, an IKE rekey exchange, between the requester and the responder, carries one or more SA payloads, which themselves may include one or more proposal payloads. Each proposal payload comprises a single set of cryptographic suite (e.g., a single or multiple cryptographic suites). Usually these suites are not changed at rekey time. The minimum size of (e.g., for a single set of cryptographic suite) SA payload is typically 52 bytes. For IKE rekey the minimum size is 44 bytes. This may comprise the SA payload size of 44 bytes, and the proposal size of 40 bytes. The minimum is determined by the type and number of cryptographic suites that are selected and sent in the SA payload.

The SA payload structure typically comprises SA Payload, Proposal, transforms & Attribute. Under SA payload there will be one or more than one proposal payloads which contain protocol ID & SPI, under proposal payload there will transform which contain a cryptographic algorithm, and optionally attributes which contain key lengths. Further defining a particular proposal, e.g. by specifying attributes, will increase the SA payload size. Conventional SA payloads are disclosed in detail in RFC 7296 section 3.3.

For example, IPSec rekey exchange between the requester and the responder also carries SA payloads which contains a cryptographic suite (e.g., a single or multiple cryptographic suites) and along with TS payload (such as the TSi & TSr payloads). In most cases, these payloads are not changed at rekey time, analogously to the IKE rekey procedure. Usually, the minimum size of SA payload is 40 bytes and each TS size is of 24 bytes (2*24=48 bytes).

SUMMARY OF THE INVENTION

This summary is provided to introduce concepts related to methods, devices and systems for rekeying a security association. Furthermore, existing types of messages exchanged in the known SA rekeying process are modified. Furthermore, new messages for the SA rekeying process are introduced. Although this disclosure is discussed with reference to IKEv2, it will be understood that the invention can be equally applied to other rekey mechanisms.

According to a first aspect, an embodiment of the present application provides a method of rekeying a security association (SA) in a network system including a first network device and a second network device, wherein an Internet Key Exchange (IKE) tunnel and an Internet Protocol Security (IPSec) tunnel are established between the first network device and the second network device. In the method, the first network device sends a first rekey request to the second network device for rekeying an SA. The first rekey request carries a first Security Parameter Index (SPI) and a cryptographic suite associated with the first network device. After that, the first network device receives a first rekey response from the second network device. The first rekey response carries a second SPI and does not carry a cryptographic suite associated with the second network device when there is no change in a cryptographic suite associated with the second network device. Then, the first network device rekeys the SA according to the first SPI, the cryptographic suite associated with the first network device, and the second SPI.

In the foregoing technical solution, by not carrying the cryptographic suite in the rekey response when there is no change in the cryptographic suite associated with the second network device, the size of the payload is decreased in rekey case, which saves bandwidth, more processing time and power in the course of the SA rekey, for example, either for IKE SA rekey or the IPSec SA rekey.

According to a second aspect, an embodiment of the present application provides a method of rekeying a security association (SA) in a network system including a first network device and a second network device, wherein an Internet Key Exchange (IKE) tunnel and an Internet Protocol Security (IPSec) tunnel are established between the first network device and the second network device. In the method, the second network device receives a first rekey request from the first network device for rekeying SA, wherein the first rekey request carries a first Security Parameter Index (SPI) and a cryptographic suite associated with the first network device. After that, the second network device determines whether there is change in a cryptographic suite associated with the second network device. Then, the second network device sends a first rekey response to the first network device, wherein the first rekey response carries a second SPI and does not carry a cryptographic suite associated with the second network device when there is no change in the cryptographic suite associated with the second network device. After that, the second network device rekeys the SA according to the first SPI and the second SPI. Specifically, the currently used cryptographic suite associated with the second network device is unchanged which is used for the SA and is present in the cryptographic suite associated with the first network device carried in the first rekey request. And the rekeying is further according to the currently used cryptographic suite associated with the second network device.

In the foregoing technical solution, by not carrying the cryptographic suite in the rekey response when there is no change in the cryptographic suite associated with the second network device, the size of the payload is decreased in rekey case, which saves bandwidth, more processing time and power in the course of the SA rekey, for example, either for IKE SA rekey or the IPSec SA rekey.

According to a third aspect, an embodiment of the present application provides a network device for rekeying a security association (SA) in a network system comprising a first network device and a second network device, an Internet Key Exchange (IKE) and an Internet Protocol Security (IPSec) tunnel are established between the first network device and the second network device. In this aspect, the network device is configured as the first network device and comprises a sending module, a receiving module, a rekeying module. The sending module is configured to send a first rekey request to the second network device for rekeying an SA, wherein the first rekey request carries a first Security Parameter Index (SPI) and a cryptographic suite associated with the first network device. The receiving module is configured to receive a first rekey response from the second network device, wherein the first rekey response carries a second SPI and does not carry a cryptographic suite associated with the second network device when there is no change in a cryptographic suite associated with the second network device. The rekeying module is configured to rekey the SA according to the first SPI and second SPI.

In the foregoing technical solution, by not carrying the cryptographic suite in the rekey response, the size of the payload is decreased in rekey case, which saves bandwidth, more processing time and power in the course of the SA rekey, for example, either for IKE SA rekey or the IPSec SA rekey.

According to a forth aspect, an embodiment of the present application provides a network device for rekeying a security association (SA) in a network system comprising a first network device and a second network device, an Internet Key Exchange (IKE) and an Internet Protocol Security (IPSec) tunnel are established between the first network device and the second network device. In this aspect, the network device is configured as the second network device and comprises a receiving module, a determining module, a sending module, and a rekeying module. The receiving module is configured to receive a first rekey request from the first network device for rekeying an SA, wherein the first rekey request carries a first Security Parameter Index (SPI) and a cryptographic suite associated with the first network device. The determining module is configured to determine whether there is change in a cryptographic suite associated with the second network device. The sending module is configured to send a first rekey response to the first network device, wherein the first rekey response carries a second SPI and does not carry a cryptographic suite associated with the second network device when there is no change in the cryptographic suite associated with the second network device. The rekeying module is configured to rekey the SA according to the first SPI and second SPI.

In the foregoing technical solution, by not carrying the cryptographic suite in the rekey response, the size of the payload is decreased in rekey case, which saves bandwidth, more processing time and power in the course of the SA rekey, for example, either for IKE SA rekey or the IPSec SA rekey.

According to a fifth aspect, an embodiment of the present application provides a method of rekeying a security association (SA) in a network system including a first network device and a second network device, wherein an Internet Key Exchange (IKE) tunnel and an Internet Protocol Security (IPSec) tunnel are established between the first network device and the second network device. In the method, the first network device sends a first rekey request to the second network device for rekeying an SA. The first rekey request carries a first Security Parameter Index (SPI) and does not carry a cryptographic suite associated with the first network in the case of that there is no change in a cryptographic suite associated with the first network device. The first network device receives a first rekey response from the second network device. The first rekey response carries a second SPI and does not carry a cryptographic suite associated with the second in the case of there is no change in a cryptographic suite associated with the second network device. The first network device rekeys the SA according to the first SPI and second SPI.

In the foregoing technical solution, by not carrying the cryptographic suite in the rekey response, the size of the payload is decreased in rekey case, which saves bandwidth, more processing time and power in the course of the SA rekey, for example, either for IKE SA rekey or the IPSec SA rekey.

According to a sixth aspect, an embodiment of the present application provides a method of rekeying a security association (SA) in a network system including a first network device and a second network device, wherein an Internet Key Exchange (IKE) tunnel and an Internet Protocol Security (IPSec) tunnel are established between the first network device and the second network device. In the method, the second network device receives a first rekey request from the first network device for rekeying an SA. The first rekey request carries a first Security Parameter Index (SPI) and does not carry a cryptographic suite associated with the first network in the case of that there is no change in a cryptographic suite associated with the first network device. The second network device sends a first rekey response to the first network device. The first rekey response carries a second SPI and does not carry a cryptographic suite associated with the second in the case of there is no change in a cryptographic suite associated with the second network device. The second network device rekeys the SA according to the first SPI and second SPI.

In the foregoing technical solutions, by not carrying the cryptographic suite in the rekey request and the rekey response, the size of the payload is decreased in rekey case, which saves bandwidth, more processing time and power in the course of the SA rekey, for example, either for IKE SA rekey or the IPSec SA rekey. The payload size will be decreased proportionally in the case of multiple cryptographic suites during rekeying in both the IKE and the IPSEC SA rekey scenarios.

According to a seventh aspect, an embodiment of the present application provides a network device for rekeying a security association (SA) in a network system comprising a first network device and a second network device, an Internet Key Exchange (IKE) and an Internet Protocol Security (IPSec) tunnel are established between the first network device and the second network device. In this aspect, the network device is configured as the first network device and comprises a sending module, a receiving module, and a rekey module. The sending module is configure to send a first rekey request to the second network device for rekeying an SA, wherein the first rekey request carries a first Security Parameter Index (SPI) and does not carry a cryptographic suite associated with the first network in the case of that there is no change in a cryptographic suite associated with the first network device. The receiving module is configured to receive a first rekey response from the second network device, wherein the first rekey response carries a second SPI and does not carry a cryptographic suite associated with the second in the case of there is no change in a cryptographic suite associated with the second network device. The rekey module is configured to rekey the SA according to the first SPI and second SPI.

In the foregoing technical solution, by not carrying the cryptographic suite in the rekey response, the size of the payload is decreased in rekey case, which saves bandwidth, more processing time and power in the course of the SA rekey, for example, either for IKE SA rekey or the IPSec SA rekey.

According to an eighth aspect, an embodiment of the present application provides a network device for rekeying a security association (SA) in a network system comprising a first network device and a second network device, an Internet Key Exchange (IKE) and an Internet Protocol Security (IPSec) tunnel are established between the first network device and the second network device. In this aspect, the network device is configured as the second network device and comprises a receiving module, a sending module, and a rekey module. The receiving module is configure to receive a first rekey request from the first network device for rekeying an SA. The first rekey request carries a first Security Parameter Index (SPI) and does not carry a cryptographic suite associated with the first network in the case of that there is no change in a cryptographic suite associated with the first network device. The sending module is configured to sending a first rekey response to the first network device, The first rekey response carries a second SPI and does not carry a cryptographic suite associated with the second in the case of there is no change in a cryptographic suite associated with the second network device. The rekey module is configured to rekey the SA according to the first SPI and second SPI.

In the foregoing technical solution, by not carrying the cryptographic suite in the rekey response, the size of the payload is decreased in rekey case, which saves bandwidth, more processing time and power in the course of the SA rekey, for example, either for IKE SA rekey or the IPSec SA rekey.

According to a ninth aspect, an embodiment of the present application provides a system for rekeying a security association (SA), wherein the network system comprises a first network device according to the third aspect and a second network device according to the forth aspect.

According to an tenth aspect, an embodiment of the present application provides a system for rekeying a security association (SA), wherein the network system comprises a first network device according to the seventh aspect and a second network device according to the eighth aspect. In the foregoing technical solutions, by not carrying the cryptographic suite in the rekey request and the rekey response, the size of the payload is decreased in rekey case, which saves bandwidth, more processing time and power in the course of the SA rekey, for example, either for IKE SA rekey or the IPSec SA rekey. The payload size will be decreased proportionally in the case of multiple cryptographic suites during rekeying in both the IKE and the IPSEC SA rekey scenarios.

According to an eleventh aspect, an embodiment of the present application provides a network device for rekeying a security association (SA) in a network system comprising a first network device and a second network device. An Internet Key Exchange (IKE) and an Internet Protocol Security (IPSec) tunnel are established between the first network device and the second network device. In this aspect, the network device is configured as the first network device. The network device comprises a processor and a memory. The memory is configured to store instructions of software. The processor is configured to execute the instructions of software in the memory and cause the second network device to perform the method according to the first aspect or the fifth aspect as discussed above.

According to a twelveth aspect, an embodiment of the present application provides a network device for rekeying a security association (SA) in a network system comprising a first network device and a second network device. An Internet Key Exchange (IKE) and an Internet Protocol Security (IPSec) tunnel are established between the first network device and the second network device. In this aspect, the network device is configured as the second network device. The network device comprises a processor and a memory. The memory is configured to store instructions of software. The processor is configured to execute the instructions of software in the memory and cause the second network device to perform the method according to the second aspect or the sixth aspect as discussed above.

In the foregoing technical solutions, by not carrying the cryptographic suite in the rekey request and the rekey response, the size of the payload is decreased in rekey case, which saves bandwidth, more processing time and power in the course of the SA rekey, for example, either for IKE SA rekey or the IPSec SA rekey. The payload size will be decreased proportionally in the case of multiple cryptographic suites during rekeying in both the IKE and the IPSEC SA rekey scenarios.

According to a thirteenth aspect, an embodiment of the present application provides a computer readable storage medium. The computer readable storage medium is configured to store computer software instructions used for performing the method according to any one of the first aspect, the second aspect, the fifth aspect, and the sixth aspect as mentioned above.

In the foregoing technical solutions, by not carrying the cryptographic suite in the rekey request and the rekey response, the size of the payload is decreased in rekey case, which saves bandwidth, more processing time and power in the course of the SA rekey, for example, either for IKE SA rekey or the IPSec SA rekey. The payload size will be decreased proportionally in the case of multiple cryptographic suites during rekeying in both the IKE and the IPSEC SA rekey scenarios.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

FIG. 1A illustrates the structure of some SA payloads.

FIG. 7C illustrates an example of a NEW_SPI payload for IKE.

FIG. 7D illustrates an example of a Lightweight SA payload for the IKE.

FIG. 7E illustrates an example of the structure of the no proposal chosen notification payload.

FIG. 10C illustrates an example of a NEW_SPI payload for AH.

FIG. 10D illustrates two examples of Lightweight SA which are newly defined payload for the IPSec SA.

DETAILED DESCRIPTION OF ILLUSTRATIVE EMBODIMENTS

The embodiments of the invention can be implemented in numerous ways, such as a process, an apparatus, a system, a computer readable medium such as a computer readable storage medium or as a computer network wherein program instructions are sent over various types of e.g. optical or electronic communication links. In this description, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, numerous specific details are set forth in order to provide a thorough understanding of the invention. However, it will be understood by those skilled in the art that the present disclosure may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "calculating," "determining," "establishing", "creating", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Figure 1B:
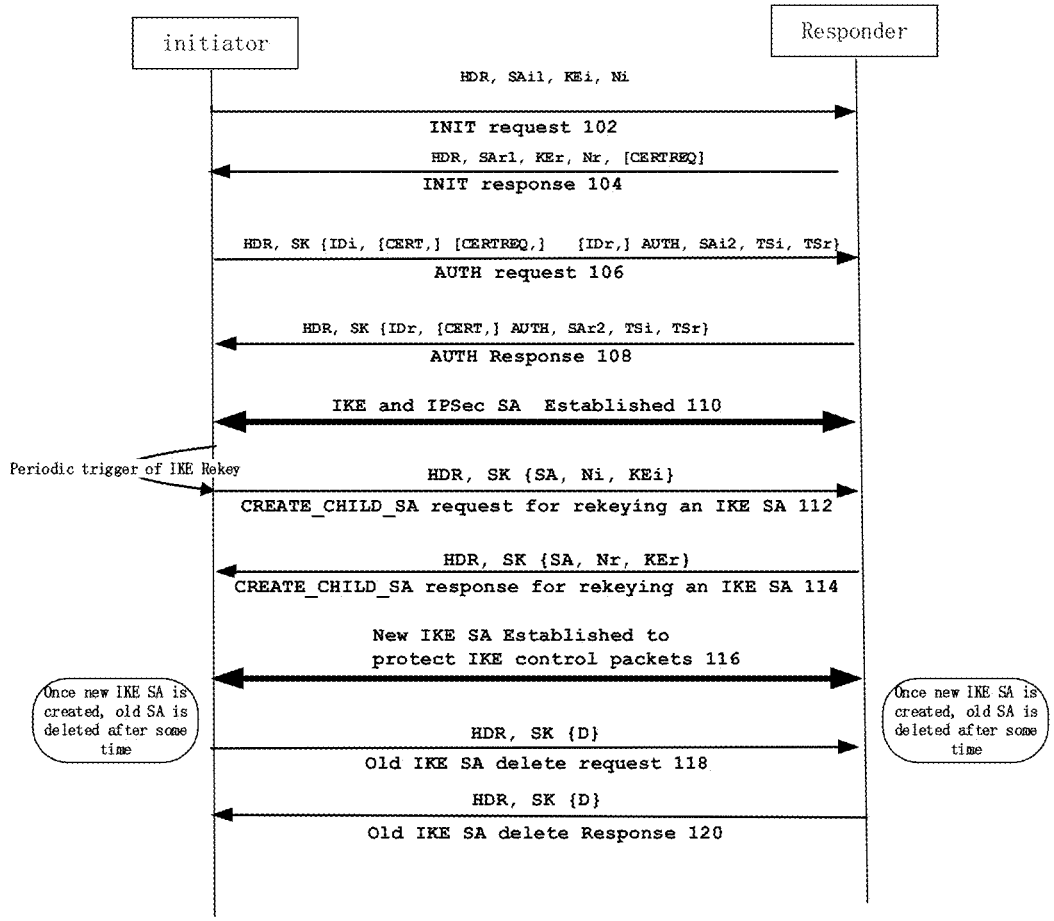
FIG. 1B illustrates an IKE SA rekey flowchart.

As is shown in FIG. 1A, pseudocode may be used to establish an encryption process including the establishment of certain attributes such as a key length. As shown in FIG. 1B, a rekey flowchart happens after the IKE and IPSec SA have been established between the first network device (e.g., the requester or some time called initiator) and the second network device (e.g., the responder).

In the embodiments of the present disclosure, the first network device or the second network device may comprise any one from the group of a computer, mobile device (e.g., mobile phone), remote health monitoring devices, gateway, router, server, and access point (AP) device embedded sensors, home or personal devices with an IP stack. In particular, one of the network devices may be a device with a limited power source, processing capability or bandwidth capability. In such cases, the invention is particularly advantageous since the size and/or number of payloads can be reduced overall, which saves processing power, time and hence power consumption.

Also in the embodiments of the present disclosure, the other of the network devices may be a security gateway/ePDG or CRAN/Cloud based device, which can support many multiples of IKE/IPSec tunnels. In such cases, by reducing the data transmitted, bandwidth and packet fragmentation and consequently processing requirements can be reduced.

The IKE SA and IPSec SA are established (operation 110) after initial exchanges which includes IKE_SA_INIT and IKE_AUTH exchanges (operations 102-108) are performed. These initial exchanges normally comprise four messages, though in some scenarios that number can grow. The first pair of messages (IKE_SA_INIT) negotiates cryptographic suites, exchanges nonces, and a Diffie-Hellman (DH). The second pair of messages (IKE_AUTH) authenticates the previous messages, exchanges identities and certificates, negotiates cryptographic suites and Traffic Selector (TS) and establishes the first Child SA. Parts of these messages are encrypted and integrity protected with keys established through the IKE_SA_INIT exchange. Messages following the initial exchange are cryptographically protected using the cryptographic algorithms and keys negotiated in the IKE_SA_INIT exchange. For each of the IKE SA and IPSec SA, the secret keys are used usually in a limited time, which may be called as the lifetime of the SA. When the lifetime is to be expired, the SA will be rekeyed through creating a new SA and deleting the old SA. For detailed procedures of the initial exchanges, the skilled person is referred to RFC 7296, which is incorporated by reference for all purposes as if fully set forth herein except where contrary to the explicit disclosure herein.

After the IKE SA and IPSec SA are established (operation 110), if any one of the lifetime of the IKE SA and IPSec SA is about to expire, the first network device and the second perform the SA rekey procedure.

It should be understood that either the first network device or the second network device can initiate the SA rekeying request, as each of the device may maintain a lifetime policy governing the lifetime for the SA on its own side. In another embodiment, the both sides may have the same lifetime for the SA they shared. The first network device or the second network device may periodically trigger the SA rekeying. In other scenarios, the device may detect the future expiration of each SA associated with the device, and then initiate the SA rekeying process if the device detects that the secret keys of the IKE SA or the IPSec SA(s) is about to expire.

As the name suggests, SA rekey refers to creating a SA with new Key with same SA attributes as the current SA, unless the policy is changed. Changing a policy may, for example be when an end user changes the cryptographic policy (may also be called cryptographic suite(s)), and/or the life time of the cryptographic suite(s), or changes the flow policy (may also be called flow information) in the case of the child SAs rekey. The flow information may comprise, e.g., source and destination IP address, port range or port number. Rekeying SA comprises recreating the key for the SA, i.e., the key is changed, the other elements of the established SA may or may not change.

Take the first network device initiating an IKE SA rekeying as an example. The first network device sends a rekey request to the second network device for rekeying IKE SA. In one embodiment, a CREATE_CHILD_SA exchange is used to rekey the IKE SA. This exchange comprises a request/response pair. It may be initiated by either end (e.g., the first network device or the second network device) of the IKE SA after the initial exchanges are completed. The end initiating the SA rekey can be regarded as the initiator and the peer side of the initiator is regarded as the responder.

According to an embodiment, rekeying an IKE SA may include at least the following operations:

Operation 112, the initiator sends CREATE_CHILD_SA request for rekeying an IKE SA to the responder.

The CREATE_CHILD_SA request includes a HDR which is an IKE header (not a payload) and payloads. The payloads comprise a SA payload, a Ni payload, and a KEi payload. The SA payloads comprises an SA offer (s), for example, one or more the cryptographic suites which the initiator supports. The cryptographic suite may comprise authentication algorithms, encryption algorithms, and/or DH group for Key calculation. Furthermore, the SA payload may also comprise a new initiator Security Parameter Indexes (SPI) which is supplied in the SPI field of the SA payload. The new initiator SPI in the SA payload will be taken by the responder and new Key is calculated at responder side. The Ni payload includes a nonce, the KEi payload includes a Diffie-Hellman value. In this disclosure, the term "cryptographic suite" refers to a set of algorithms used to protect an SA. In the situation of the IPSEC SA or IKE SA, the cryptographic suite may also call an IPSec proposal or IKE proposal in certain circumstance. The new initiator SPI may be used to identify the new IKE SA after rekey at the initiator side.

Operation 114, once the responder receives a request to rekey an IKE SA, The responder sends a CREATE_CHILD_SA response for rekeying an IKE SA to the initiator.

The CREATE_CHILD_SA response includes a HDR and payloads, and the payloads comprise a SA payload, an Nr payload, and a KEr payload. The SA payload includes a new responder SPI in the SPI field of the SA payload. The SA payload also includes the responder selected cryptographic suite from the offer of the initiator. The Nr payload includes a nonce, and the KEr payload includes a Diffie-Hellman value if the selected cryptographic suite includes that group. The new responder SPI may be used to identify the new IKE SA after rekey at the responder side. As such, the combination of the new responder SPI and the new initiator SPI are used to identify the new IKE SA. In addition, the new responder SPI in the SA payload is taken by the initiator and new Key is calculated at initiator side.

Operation 116, a new IKE SA is established. The new IKE SA is used to protect IKE control packets.

The new IKE SA, i.e., the rekeyed IKE SA inherits all the child SAs of the IKE SA, which means the existing child SAs that are linked with old IKE SA will be moved to new IKE SA after rekey is successful.

After IKE CREATE_CHILD_SA exchange as shown in operations 112 and 114, a new IKE SA is created with new keys and selected cryptographic suite and is identified with the new initiator SPI and the new responder SPI which are exchanged in the SA payload as discussed above.

Operation 118, the initiator sends an old IKE SA delete request to the responder to delete the old SA.

The old IKE delete request may include a HDR and a D payload. The D payload may include information, such as protocol identifier (ID) indicating the SA to be deleted. The deletion of SA may be implemented through the INFORMATIONAL exchange between the initiator and the responder according to the RFC 7296. As an example, FIG. 1C illustrates an example of the structure of the delete request according to the RFC 7296.

Operation 120, upon receiving the old IKE SA delete request, the responder sends an old IKE SA delete response to the initiator.

The old IKE SA delete response may include a HDR and a D payload. The D payload may include information, such as protocol ID indicating the SA to be deleted. The deletion of SA may be implemented through the INFORMATIONAL exchange between the initiator and the responder according to the RFC 7296.

Figure 1C:
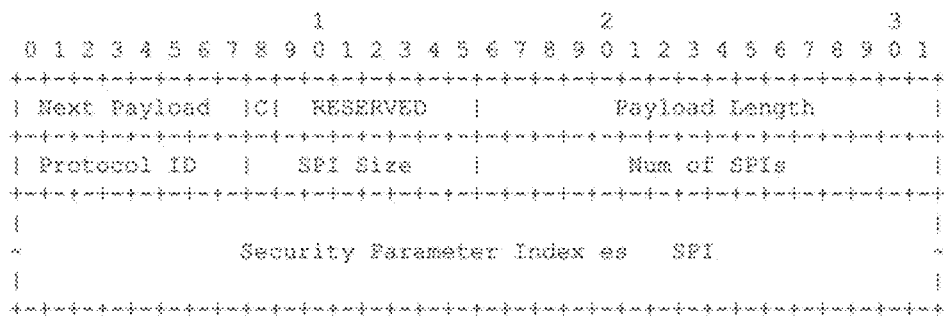
FIG. 1C illustrates an example of the structure of the delete request.

FIG. 1C provides an example of the structure of SA payloads. The first SA payload contains no attribute, and the second SA payload contains an attribute, and each of the two SA payloads contains one proposal. The third SA payload contains two proposals, each of which contains an attribute.

Payload size will increase proportionally for multiple cryptographic suites in rekeying IKE and/or IPSec SA. This rekey is triggered periodically. Each rekey consumes bandwidth and power to process these payloads.

Figure 2:
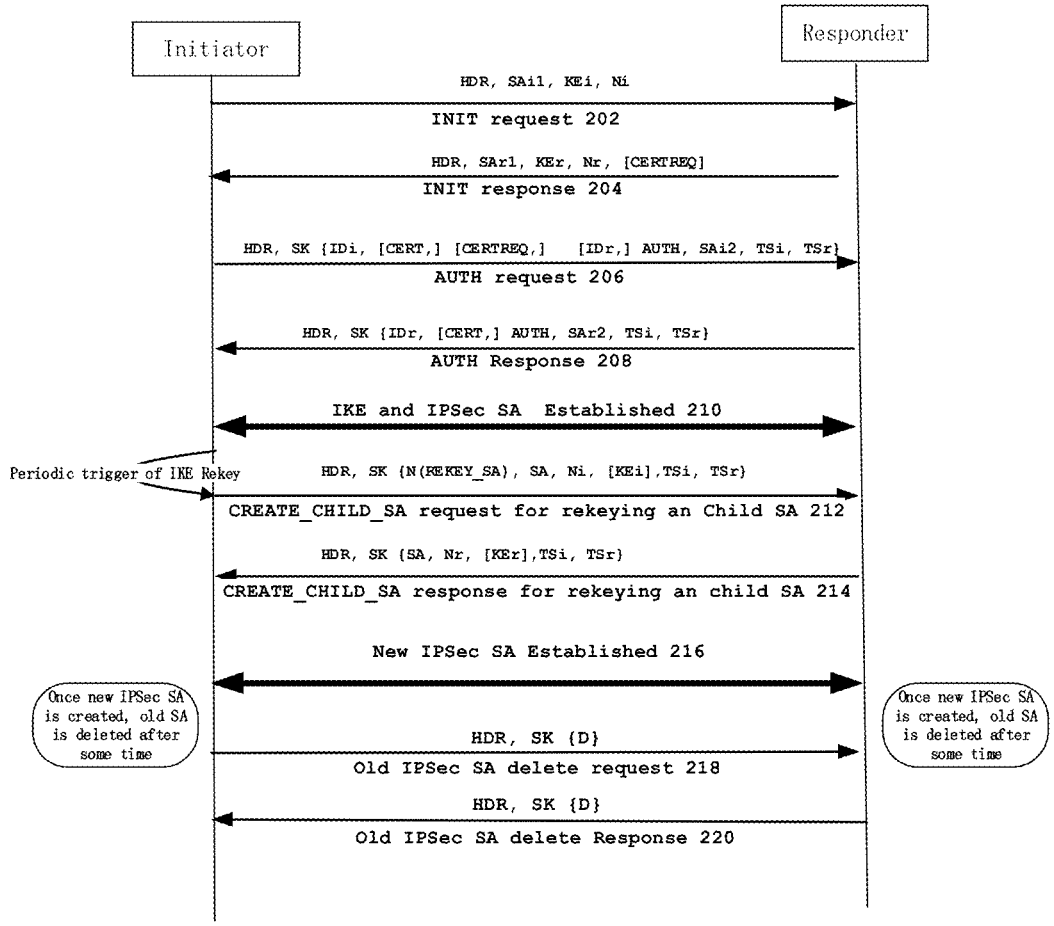
FIG. 2 illustrates an IPSec SA rekey according to the conventional art.

In reference to FIG. 2, an embodiment is illustrated in which the first network device initiates a child SA or IPSec SA rekeying. Same as the IKE SA rekey, the CREATE_CHILD_SA exchange may also be used to rekey the child SA.

According to the embodiment, rekeying an IKE SA may include at least the following operations:

Operations 202-210 may refer to the operations 102-110.

Operation 212, the initiator sends CREATE_CHILD_SA request for rekeying a child SA to the responder.

The CREATE_CHILD_SA request includes a HDR, which is an IKE header, and payloads. The payloads comprise N(REKEY_SA) payload, a SA payload, a Ni payload, TSi and TSr payload, and an optional KEi payload.

The REKEY_SA payload, which is defined in RFC7296, is used to notify other peer that rekey is happening for the existing child SA. The SPI of existing child SA which is being rekeyed is added in the SPI field of the REKEY_SA payload and the responder can identify the SA using the SPI included. Furthermore, a Protocol ID field of the REKEY_SA payload is set to match the protocol of the SA to be rekeyed, for example, 3 for ESP and 2 for AH.

The SA payloads comprises an SA offer (s), for example, one or more cryptographic suites which the initiator supports. The SA payload may also comprise a new initiator SPI which is supplied in the SPI field of the SA payload.

The new initiator SPI may be used as an inbound SPI in the initiator for the new IPSec SA after rekey and used as an outbound SPI in the responder for the new IPSec SA after rekey. The Ni payload includes a nonce, and the optional KEi payload includes a Diffie-Hellman value. The proposed Traffic Selectors for the proposed Child SA is included in the TSi and TSr payloads. The Traffic Selectors comprises flow information associated with the initiator to be rekeyed which is used by the initiator for traffic communication, such as an address range (IPv4 or IPv6), a port range, and an IP protocol ID.

Assuming that the proposal is acceptable to the responder, the responder sends identical TS payloads back. In another case, the responder is allowed to choose a subset of the traffic proposed by the initiator. This could happen, for example, when the flow configurations of the two ends are being updated but only one end has received the new information. Since the two ends may be configured by different end users, such as network administrator, the incompatibility may persist for an extended period even in the absence of errors. When the responder chooses a subset of the traffic proposed by the initiator, it narrows the Traffic Selectors to some subset of the initiator's proposal (provided the set does not become the null set).

Operation 214: once the responder receives a request to rekey a child SA, The responder sends a CREATE_CHILD_SA response for rekeying a child SA to the initiator.

The CREATE_CHILD_SA response includes a HDR and payloads, and the payloads comprise a SA payload, an Nr payload, TSi and TSr payload, and an optional KEr payload.

The SA payload includes a new responder SPI in the SPI field of the SA payload. The new responder SPI may be used as an inbound SPI in the responder for the new IPSec SA after rekey and used as an outbound SPI in the initiator for the new IPSec SA after rekey. The SA payload also includes the responder selected cryptographic suite from the offer of the initiator. The Nr payload include a nonce, and the KEr payload includes a Diffie-Hellman value if the selected cryptographic suite includes that group.

As discussed above, the responder may send identical TS payloads back to the initiator, or also may choose a subset of the traffic proposed by the initiator to send back to the initiator.

In one embodiment, the responder performs the narrowing as follows:

If the responder's policy does not allow it to accept any part of the proposed Traffic Selectors, it responds with a TS_UNACCEPTABLE Notify message.

If the responder's policy allows the entire set of traffic covered by TSi and TSr, no narrowing is necessary, and the responder can return the same TSi and TSr values.

If the responder's policy allows it to accept the first selector of TSi and TSr, then the responder will narrow the Traffic Selectors to a subset that includes the initiator's first choices.

If the responder's policy does not allow it to accept the first selector of TSi and TSr, the responder narrows to an acceptable subset of TSi and TSr.

Operation 216, a new IPSec SA is created.

After the new IPSec SA is established, the new IPSec SA, i.e., the rekeyed IPsec SA is added to the IKE SA with which the IPSec SA to be rekeyed is associated, which means there will be a link from IKE SA to its corresponding child SA. So the new child SA created after rekey is added to IKE SA.

After IKE CREATE_CHILD_SA exchange as shown in operations 212 and 214, a new IPSec SA is created with new keys and selected cryptographic suite and identified with new initiator SPI and the new responder SPI which are exchanged in the SA payload as discussed above.

Operation 218, the initiator sends an old child SA delete request to the responder to delete the old SA.

The old child delete request may include a HDR and a D payload. The D payload may include information, such as protocol ID indicating the SA to be deleted. The deletion of SA may be implemented through the INFORMATIONAL exchange between the initiator and the responder according to the RFC 7296.

Operation 220, upon receiving the old child SA delete request, the responder sends an old child SA delete response to the initiator.

The old child SA delete response may include a HDR and a D payload. The D payload may include information, such as protocol ID indicating the SA to be deleted. The deletion of SA may be implemented through the INFORMATIONAL exchange between the initiator and the responder according to the RFC 7296.

As can be seen from the above prior art methods of FIGS. 1 and 2, at the time of rekeying IKE SA, the exchange between the initiator and the responder includes the SA payload containing a single or multiple cryptographic suites, even though there is no change in the cryptographic policy (e.g., the cryptographic suite) associated with the rekeying SA. In other words, even though the initiator and/or the responder changes the cryptographic suite(s) associated therewith, the rekeying exchange between the initiator and the responder still includes the SA payload containing a single or multiple cryptographic suites. For the IPSec SA rekey, at the time of rekeying, the exchange between the initiator and the responder includes the SA payload containing a single or multiple cryptographic suites and along with TSi & TSr payloads, even though there is no change in the cryptographic policy associated with the rekeying SA and flow policy.

As the SA rekey is triggered periodically, it consumes bandwidth and power to process these payloads. The problem becomes more serious in the case of the multiple cryptographic suites, as the payload size will increase proportionally for multiple cryptographic suites in both IKE SA and IPSec SA.

Decreasing the size of IKEv2 messages is highly desirable, e.g., for the Internet of Things (IoT) devices utilizing lower power consumption technology. For some of such devices the power consumption for transmitting extra bits over network is prohibitively high. Many such devices are battery powered without an ability to recharge or to replace the battery which serves for the life cycle of the device (often several years). For this reason, the task of reducing the power consumption for such devices is very important.

Furthermore, large UDP messages may also cause fragmentation on IP level, which may interact badly with Network Address Translators (NAT). In particular, some NATs drop IP fragments that don't contain TCP/UDP port numbers (non-initial IP fragments). Most of IOT devices will have single set of suits or they don't prefer to change selected suits time of rekey.

In one example, in case of rekeying IKE SAs with the CREATE_CHILD_SA Exchange, the minimum size of (single set of cryptographic suite) SA payload is 52 bytes, whereas in the embodiments of the invention these payloads are replaced with Notify payload N(NEW_SPI) to get SPI which is of size 16 bytes. So 36 bytes are saved.

In another example, in case of rekeying Child SAs with the CREATE_CHILD_SA Exchange, minimum size of SA payload 40 is bytes, each TS size is 24 bytes (2*24=48 bytes), accordingly, the total size 88 is bytes. Whereas in the embodiments of the invention these payloads are replaced with Notify payload N(NEW_SPI) to get SPI which of size is 12 bytes, so in total 76 bytes are saved.

The disclosure provides a lightweight rekey solution to address the problem as mentioned above. In this solution, when there is no change in cryptographic policy, the exchange between the initiator and the responder carries no SA payload in either of the IKE rekey and IPSec SA rekey procedures. Instead, the SPI is transferred, such as in a new notification type payload called herein "NEW_SPI notification" (which may be in place of the existing SA payload) or a new payload called herein "Lightweight SA payload" or any other payload to send SPI. The NEW_SPI notification uses fewer bits than the existing SA payload. In an additional further saving of transmitted bits, when there is no change the flow information, the exchange between the initiator and the responder also carries no TS payload in IPSec SA rekey. As an example, the "Lightweight SA payload" format may only contain the SA payload header and proposal payload. Thus compared to conventional payloads, such as those sent in Sai1 and SAr1, the payload is trimmed.

To implement the lightweight rekey approach, the two ends may exchange their respective capabilities of performing the lightweight rekey method. This exchange may be performed before the rekey process, for example during the initial exchanges for setting up the IKE or IPSec SA as discussed above.

According to an embodiment of the disclosure, the exchange of the capability of the lightweight rekey may comprise the following operations between two peers:

The initiator sends a notification to the second network device to indicate that the initiator supports the lightweight rekey, for example supports a rekey optional payload.

The responder sends a response to indicate that the responder also supports the lightweight rekey, for example supports a rekey optional payload.

Through this initial support process, the two ends could know between each other whether the peer supports the lightweight rekey approach.

FIGS. 3A-5 illustrate three different ways to negotiate the support of the lightweight rekey between the initiator and the responder. All the three ways use the initial exchange process to implement the lightweight rekey negotiation. As mentioned above, the present disclosure does not limit to only use the initial exchange process to implement the lightweight rekey negotiation, other ways may be envisioned by the skilled person in the art after reading the disclosure.

Figure 3A:
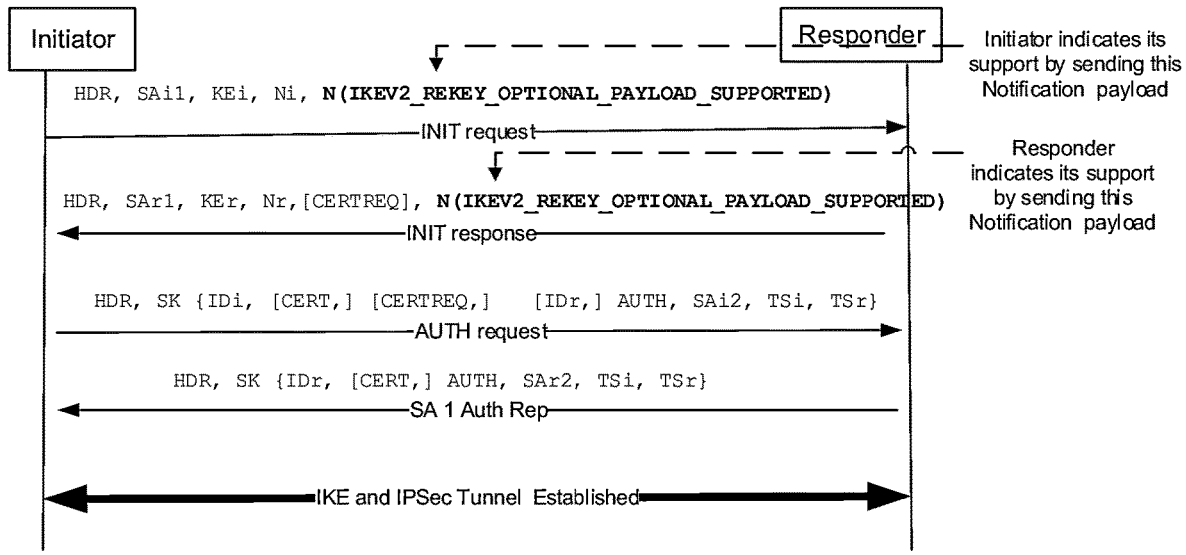
FIG. 3A illustrates a flowcharts of negotiating the support of the lightweight rekey between the initiator and the responder according to the embodiments of the present disclosure.
Figure 3B:
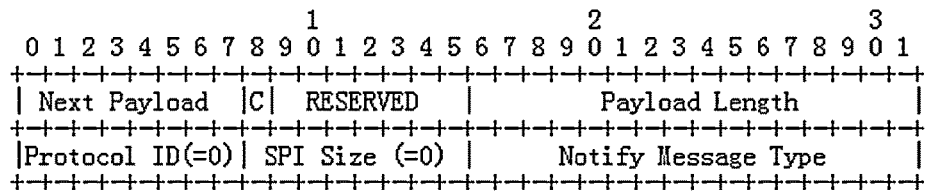
FIG. 3B illustrates an example of the structure of the notification payload.

In the embodiment as illustrated in FIG. 3A, the notification of supporting lightweight rekey is carried in a notification payload in a INIT request, e.g., the IKE_SA_INIT request message, sent by the initiator to the responder, and accordingly a confirmation of supporting lightweight rekey is carried in a notification payload in the INIT response, e.g., the IKE_SA_INIT response message, sent from the responder to the initiator As an example, FIG. 3B illustrates the structure of the notification payload in which the notify message type is the IKEV2_REKEY_OPTIONAL_PAYLOAD_SUPPORTED, which is a new "Notify Message Type" as compared to the conventional notify payload. The new Notify Message Type, such as the IKEV2_REKEY_OPTIONAL_PAYLOAD_SUPPORTED, is contained in the notification payload and indicates that the initiator or the responder supports the lightweight rekey.

Figure 4:
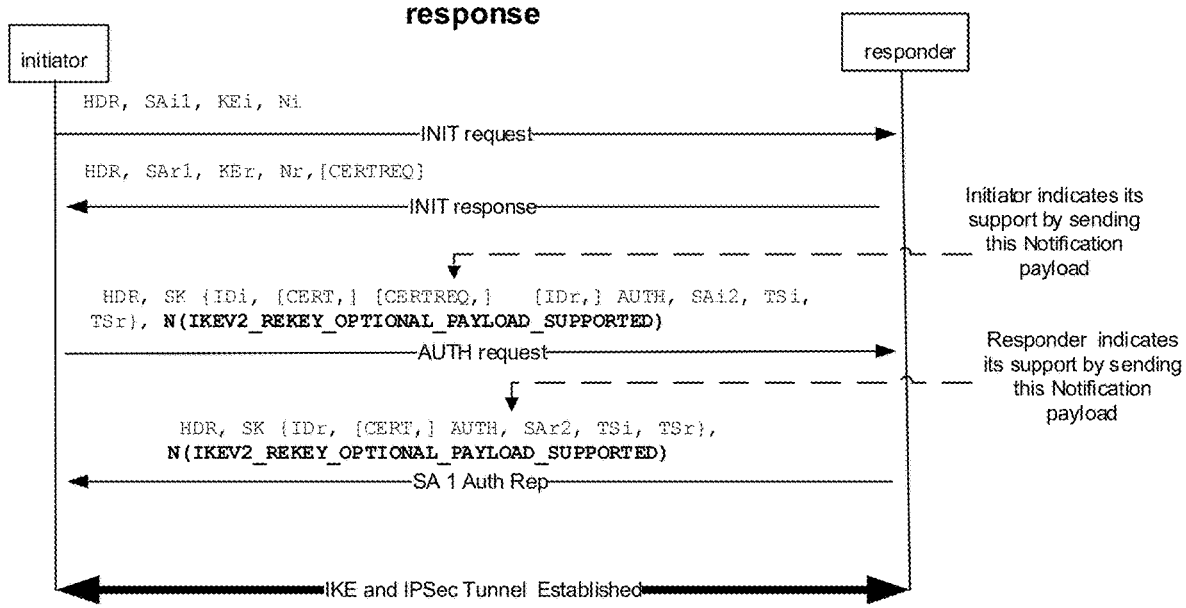
FIG. 4 illustrates another flowchart of negotiating the support of the lightweight rekey between the initiator and the responder according to the embodiments of the present disclosure.

In the embodiment as illustrated in FIG. 4, the notification of supporting lightweight rekey is carried in a notification payload in a AUTH request, e.g., the IKE_SA_AUTH request message, sent by the initiator to the responder, and accordingly a notification of supporting lightweight rekey is carried in a notification payload in a AUTH request, e.g., the IKE_SA_AUTH response message, sent from the responder to the initiator. The type of the notification payload may be an IKEV2_REKEY_OPTIONAL_PAYLOAD_SUPPORTED payload.

Figure 5:
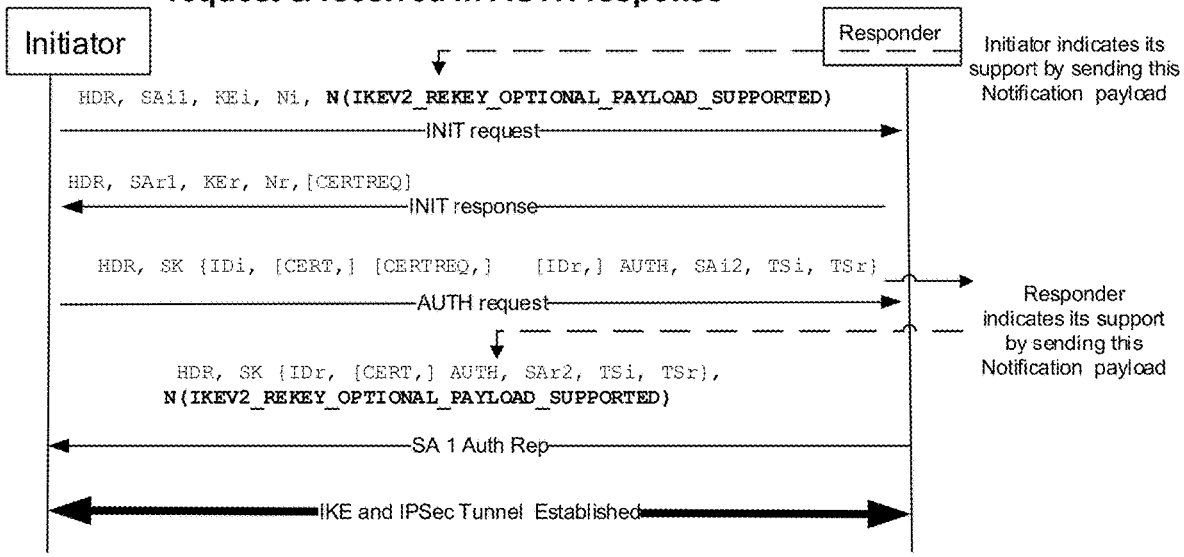
FIG. 5 illustrates yet another flowchart of negotiating the support of the lightweight rekey between the initiator and the responder according to the embodiments of the present disclosure.

In the embodiment as illustrated in FIG. 5, the notification of supporting lightweight rekey is carried in a notification payload in a INIT request, e.g., the IKE_SA_INIT request message, sent by the initiator to the responder, and accordingly a notification of supporting lightweight rekey is carried in a notification payload in a AUTH response, e.g., the IKE_SA_AUTH response message, sent from the responder to the initiator. The type of the notification payload may be an IKEV2_REKEY_OPTIONAL_PAYLOAD_SUPPORTED payload.

It should be noted that the capability of the lightweight rekey negotiation may be not performed before the rekey process, e.g., during the IKE INIT or AUTH, which means both parties did not agree for this, then if any either of the initiator or the responder should not be allowed to send NEW_SPI or Light Weight SA Payload, the other party can drop this and treat as an error.

Figure 6:
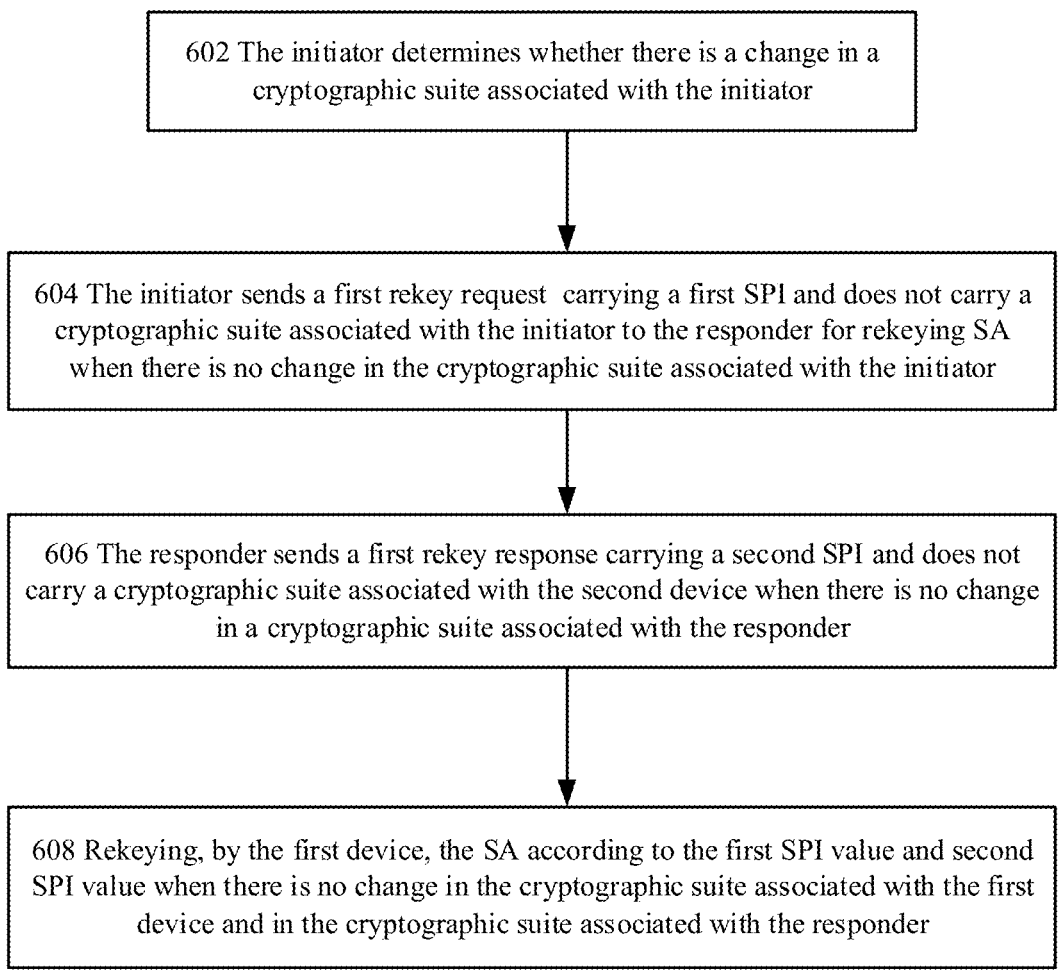
FIG. 6 illustrates a flowchart of rekeying SA using the lightweight rekey approach according to one embodiment of the present disclosure.

FIG. 6 illustrates a flowchart of rekeying SA using the lightweight rekey approach.

After the IKE and IPSec SA(s) between the initiator and a responder are established, if the lifetime of any one of the IKE and IPSec SA(s) are close to expiration according to the SA lifetime policy on each end, the initiator initiates the rekey process which may include the following operations:

Operation 602, the initiator determines whether there is a change in a cryptographic suite associated with the initiator.

In this disclosure, a cryptographic suite associated with the initiator means a cryptographic suite is supported by the initiator and used for a certain SA established by the initiator, for example the rekeyed SA (i.e., the new SA) in the SA rekey situation.

After the SA associated with a weak cryptographic suite is established, and if the lifetime of any one of the SA is close to expiration, the initiator wants to rekey the SA by creating a new SA and deleting the to be rekeyed SA (may be also called the old SA) with or without changing the cryptographic suite used for the old SA (or may be also called associated with the old SA). In other words, a cryptographic suite associated with the initiator not changed means that the cryptographic suite which the old SA used may be still used for the rekeyed SA (i.e., the new SA). A cryptographic suite associated with the initiator changed means that the cryptographic suite with which the old SA associated is changed to another cryptographic suite which is supported by the initiator and used for the new SA (i.e., associated with the new SA). The following provides some situations for the change of the cryptographic suite associated with the initiator.

One situation is that the cryptographic suite supported by the initiator is changed. For example, the initiator current only supports a first cryptographic suite (e.g., a weak cryptographic suite). After the old SA is established, the support of the cryptographic suite by the initiator is changed to a second cryptographic suite (a strong cryptographic suite) for some reasons (e.g., the initiator takes a more important role with higher security requirement) by the network administrator by configuring the initiator via the user interface. After the cryptographic suite is changed, if the initiator wants to rekey the old SA, the initiator needs to change the cryptographic suite for the new SA, since the initiator now only support the strong cryptographic suite.

Another situation is that the cryptographic suite supported by the initiator is not changed. For example, the initiator current supports two or more cryptographic suites. When making the rekeying, the initiator wants to use a new cryptographic suite for the new SA rather than using the cryptographic suite associated with the old SA for some reason, for example the requirement of the SA is improve, which needs a stronger cryptographic suite used for the new SA. In this situation, the rekey request the initiator sends to the responder needs to carry the second cryptographic suite for the new SA, since the first cryptographic suite associated with the old SA is no longer associated with the new SA. The detailed implementation is disclosed in the description of FIGS. 7A-12.

Further, another situation is that if the initiator only supports a first cryptographic suite, for example the weak cryptographic suite, and the initiator wants to change the first cryptographic suite to a second cryptographic suite when rekeying the old SA (for example, change to a strong cryptographic suite) for some reasons. In this situation, there need to reconfigure the initiator since the initiator currently only supports the first cryptographic suite. The network administrator may select to reconfigure the initiator with supporting the second cryptographic suite, or supporting both the first cryptographic suite and the second cryptographic suite. And the configuration is stored in the initiator or some other data base or devices. For example, there is a correspondence between the initiator and the cryptographic suite (s) supported by the initiator may be stored in the initiator or some other places. The configuration process at the responder side is similar as the above. After the reconfiguration, the initiator can select the supporting second cryptographic suite and put the second cryptographic suite in the rekey request for the SA rekeying exchanges.

The following provides some situations for no change in the cryptographic suite associated with the initiator.

One situation is that initiator only supports a first cryptographic suite, for example the weak cryptographic suite, and the initiator wants to keep the first cryptographic suite on change when rekeying the old SA (i.e., the first cryptographic suite is still used for the rekeyed SA), the rekey request the initiator sends to the responder does not carry a cryptographic suite for the new SA, since the first cryptographic suite associated with the old SA is still associated with the new SA.

Another situation is that the initiator supports two or more cryptographic suites, for example, a first cryptographic suite (e.g., the weak cryptographic suite) and a second cryptographic suite (e.g., a strong cryptographic suite), and the initiator does not want to change the first cryptographic suite to a second cryptographic suite when rekeying the old SA. In this situation, the rekey request the initiator sends to the responder needs not carry the cryptographic suite for the new SA, since the first cryptographic suite associated with the old SA is still used for the new SA. The detailed implementation please refer to the description of FIGS. 7A-12.

Operation 604, the initiator sends a first rekey request to the responder for rekeying SA when there is no change in the cryptographic suite associated with the initiator.

As discussed above, no change in a cryptographic suite associated with the initiator means that the cryptographic suite which the old SA used may still be used for the rekeyed SA (i.e., the new SA). There is no need for the initiator to carry a cryptographic suite for the new SA.

The first rekey request carries a first SPI and does not carry a cryptographic suite associated with the initiator, since the initiator does not change the cryptographic suite after the SA is established, or the initiator changed ever the cryptographic suite and the changed cryptographic suite is changed back to the original one and the current cryptographic suite is the same as the cryptographic suite used when the SA is established.

In the IKE rekey scenario, the first SPI is a new initiator SPI. Since the IKE SA can be identified by pair of SPI on both ends. So when one end initiates rekey process, it will include the new SPI in the rekey request, the new SPI is used as Initiator SPI for the new IKE SA after rekey. When the responder is responding for IKE rekey in reply, the responder adds its new SPI in rekey response, which should be used as responder SPI for the new IKE SA after rekey.

In the IPSec SA rekey scenario, the first SPI is used as an inbound SPI in the initiator for the new IPSec SA after rekey and is used as an outbound SPI in the responder for the new IPSec SA after rekey. Furthermore, the first rekey request also carries a SPI in the N [REKEY_SA] payload to identify the SA to be rekeyed as discussed above.

Figure 7A:
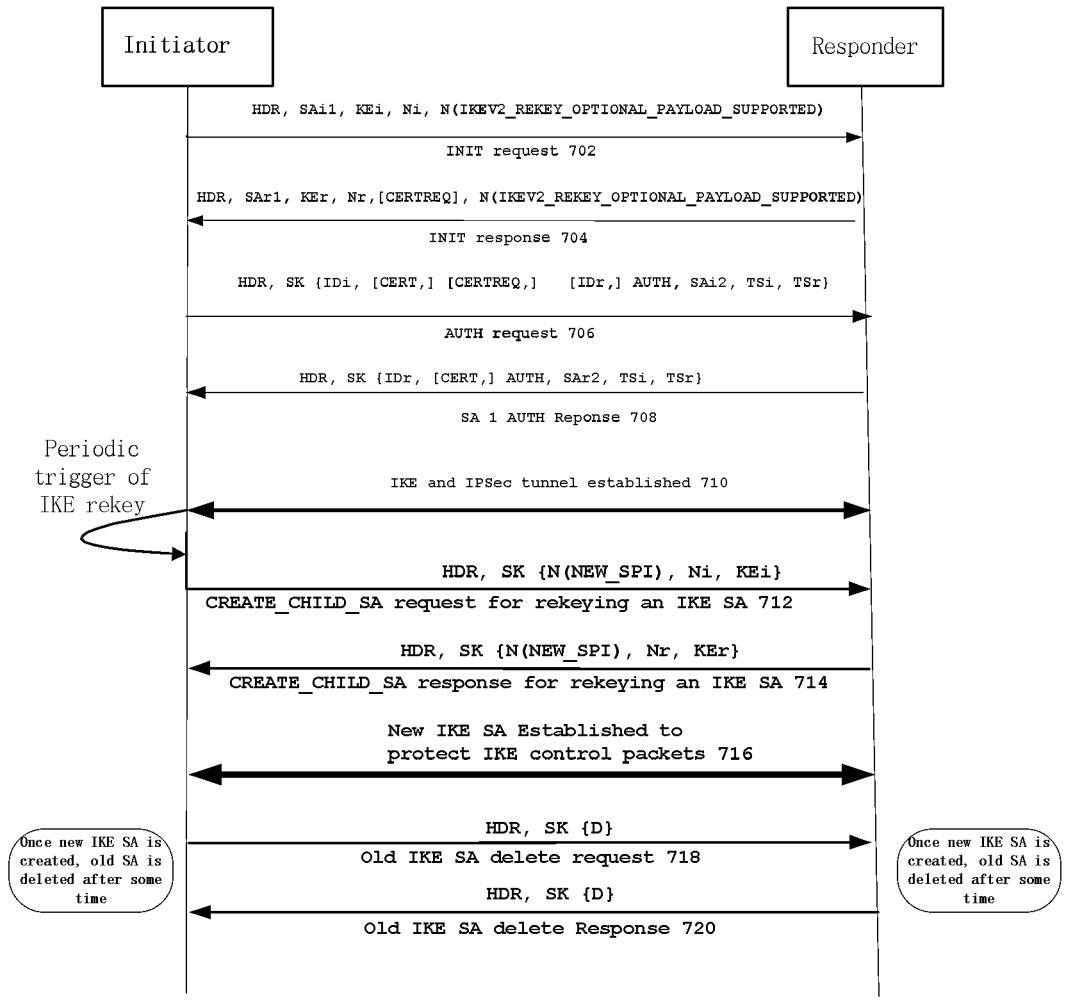
FIG. 7A illustrate a flowchart of rekeying the IKE SA using the lightweight rekey approach according to one embodiment of the present disclosure.
Figure 7B:
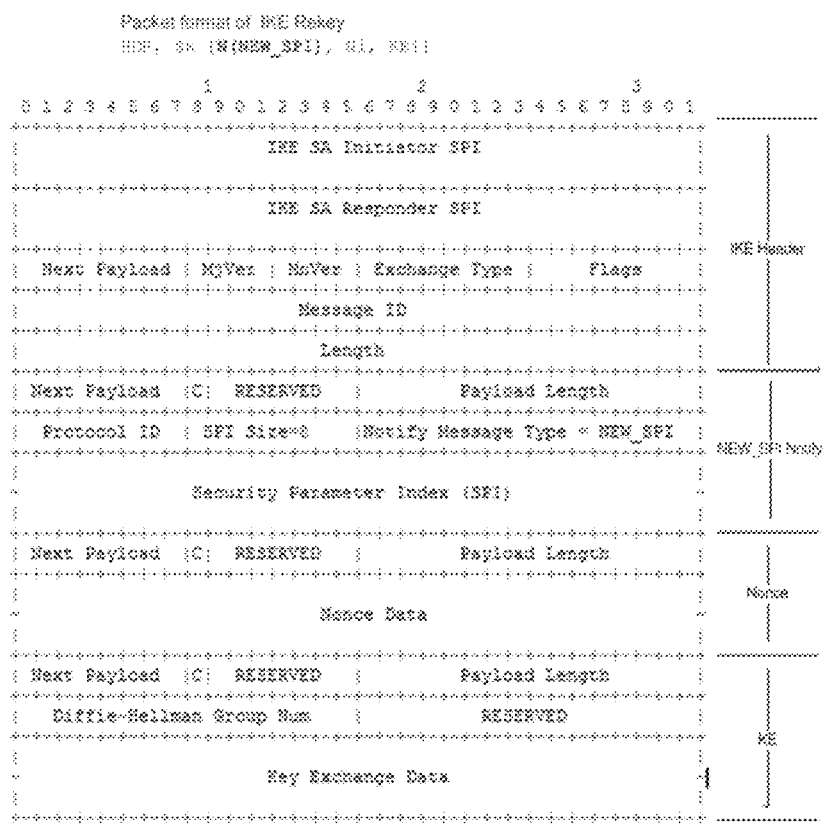
FIG. 7B illustrates an example of an IKE SA rekey request packet format.
Figure 8:
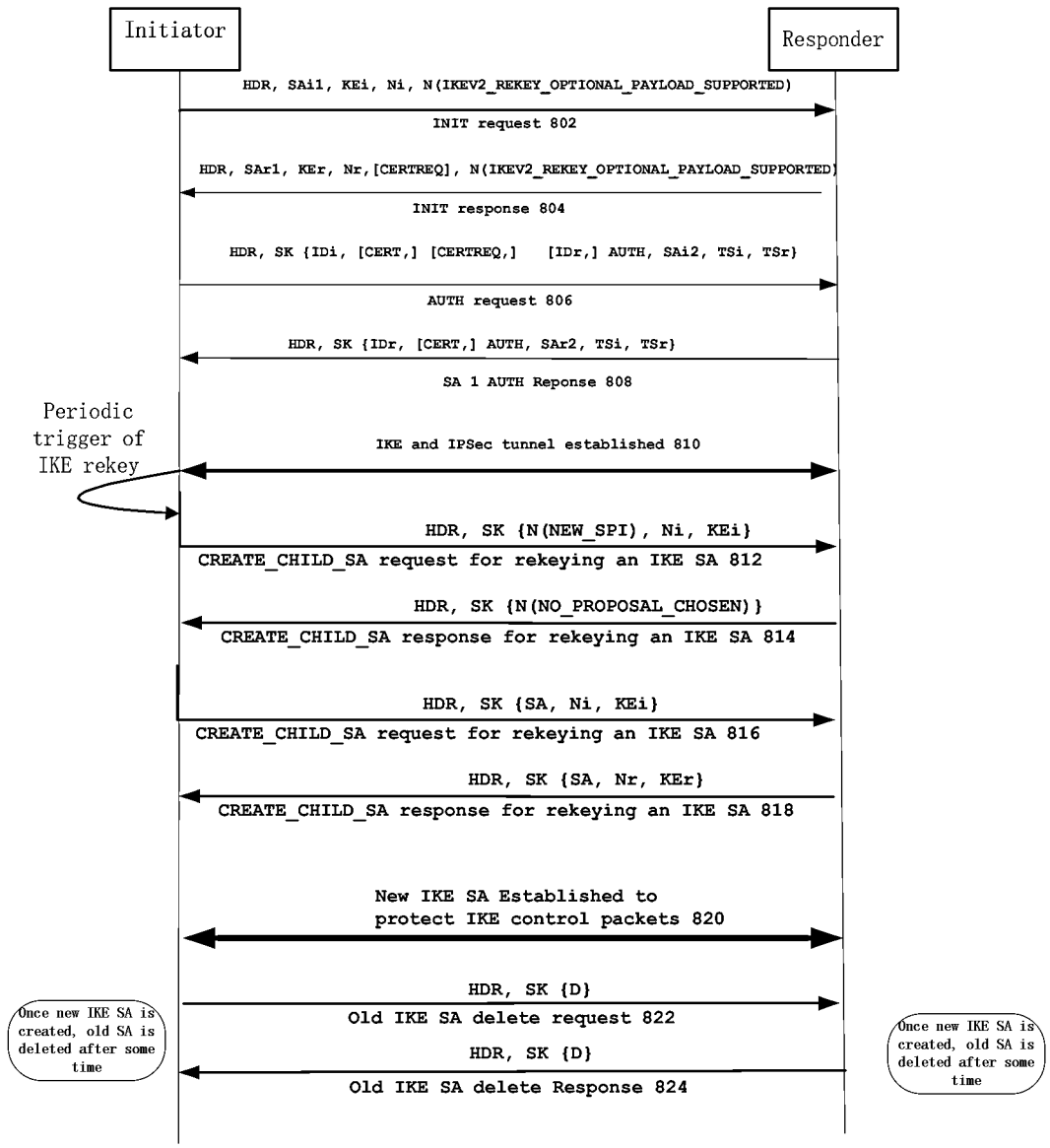
FIG. 8 illustrate a flowchart of rekeying the IKE SA in a specific scenario according to one embodiment of the present disclosure.
Figure 9:
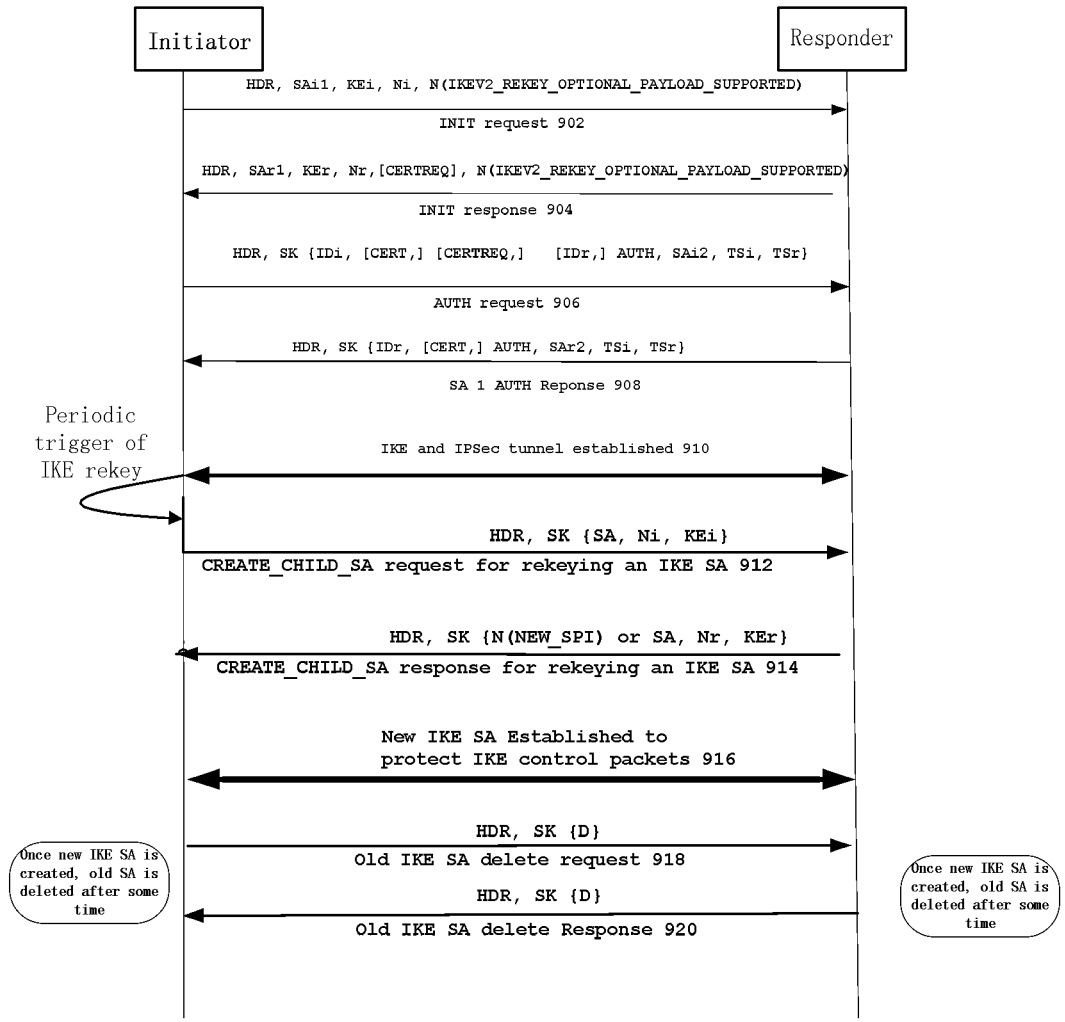
FIG. 9 illustrate another flowchart of rekeying the IKE SA using the lightweight rekey approach according to another embodiment of the present disclosure.

The detailed implementation of this operation may be referred to the following IKE rekey process as illustrated in FIGS. 7-9.

Operation 606, the responder sends a first rekey response to the initiator. The first rekey response carries a second SPI and does not carry a cryptographic suite associated with the second network device when there is no change in a cryptographic suite associated with the responder.

As discussed above, in the IKE rekey scenario, the second SPI is a new responder SPI. When the responder is responding for the IKE rekey in reply, the responder adds the new responder SPI in the rekey response, which should be used as responder SPI for the new IKE SA after rekey.

In the IPSec SA rekey scenario, the second SPI is used as an inbound SPI in the responder for the new IPSec SA after rekey and is used as an outbound SPI in the initiator for the new IPSec SA after rekey.

Figure 10A:
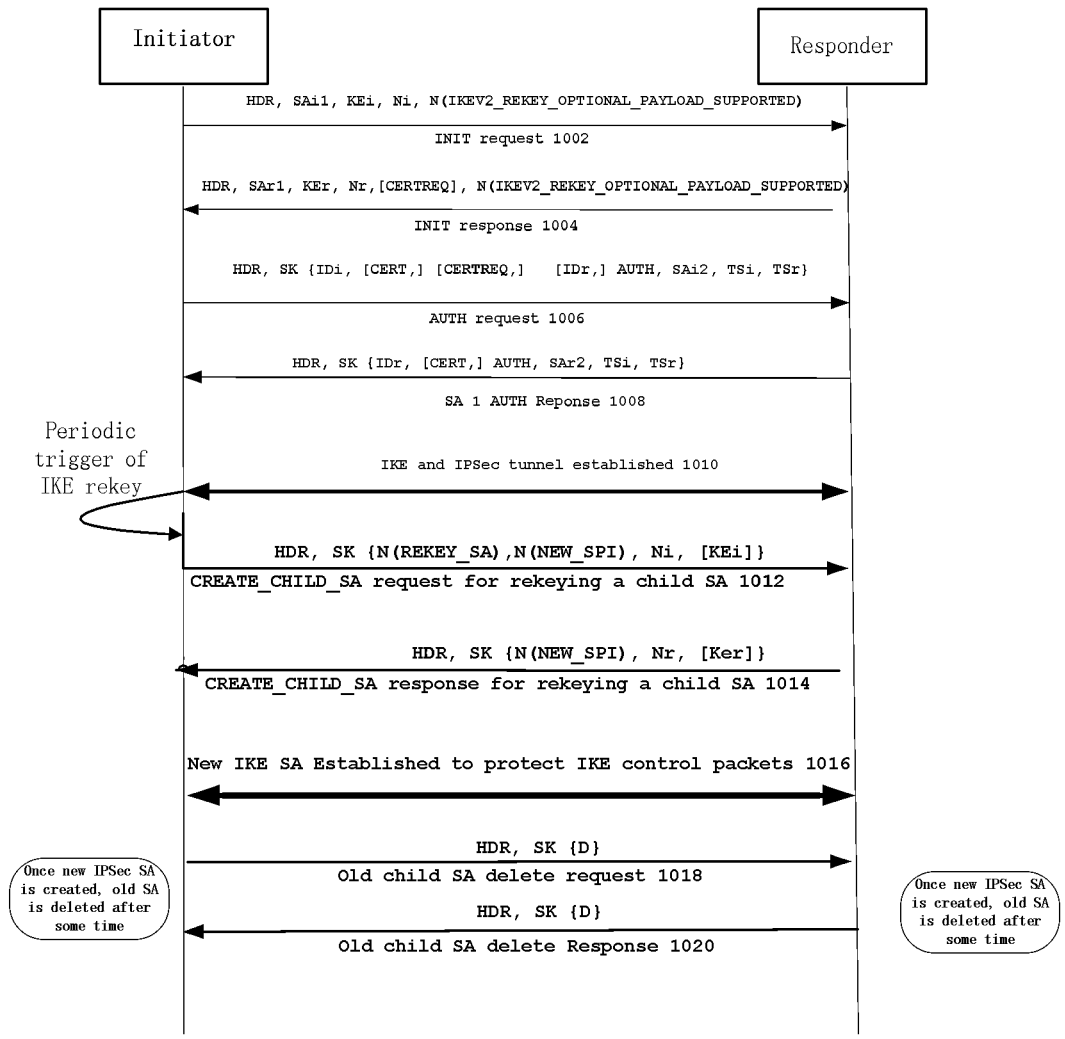
FIG. 10A illustrate a flowchart of rekeying the IPSec SA using the lightweight rekey approach according to one embodiment of the present disclosure.

The detailed implementation of this operation may be referred to the following IKE rekey process as illustrated in FIGS. 8-10.

Operation 608, rekeying, by the initiator, the SA according to the first SPI and second SPI when there is no change in the cryptographic suite associated with the first network device and in the cryptographic suite associated with the second network device.

The rekeying comprise creating a new SA and deleting the old SA which is to be rekeyed. Specifically, the initiator rekey the SA by using the initiator SPI, the responder SPI, and the unchanged cryptographic suite which is used for the old SA to obtain the new key for the new SA. The detailed implementation may be referred to the following IKE rekey process as illustrated in FIGS. 7-9.

FIG. 7A is a flowchart that illustrates rekeying the IKE SA according to an embodiment of the present disclosure. In this embodiment, the initiator does not change the cryptographic suite which is used when the SA to be rekeyed is established, for example, a strong a higher cryptographic suite with higher cryptographic algorithm set.

In this embodiment, there are two scenarios, the first scenario is that the responder also does not change the cryptographic suite. The second scenario is that the responder wants to changes the cryptographic suite.

According to the first scenario of this embodiment, the IKE rekey process comprises the following operations.

Operation 702, the initiator sends an INIT request to the responder. The INIT request carries a notification payload with the exception of the normal HDR head and payloads as mentioned above. In this embodiment, the notification payload is an IKEV2_REKEY_OPTIONAL_PAYLOAD_SUPPORTED payload, which indicates that the initiator supports the lightweight rekey.

Operation 704, the responder sends an INIT response to the initiator. The INIT response carries a notification payload with the exception of the normal HDR head and payloads as mentioned above. In this embodiment, the notification payload is an IKEV2_REKEY_OPTIONAL_PAYLOAD_SUPPORTED payload, which indicates that the responder supports the lightweight rekey approach.

According to the initial exchange as discussed, after the Operation 706 and 708 are performed, the IKE SA and IPSec SA are established between the initiator and the responder.

It should be understood that other ways of negotiating the capability of lightweight rekey as described in FIGS. 3-5 may also applied to this embodiment.

Operation 710, IKE SA and IPSec SA are established and the initiator periodically triggers the IKE rekey.

The initiator may periodically detect whether the lifetime of the IKE SA is about to expire. As discussed above, the initiator may maintain the lifetime policy on its side. The lifetime policy may set different lifetime for different SAs. When the initiator detects that the lifetime of the IKE SA is about to expire, the operation 712 is performed.

Operation 712, the initiator sends a CREATE_CHILD_SA request for rekeying an IKE SA to the responder. The CREATE_CHILD_SA request comprises a HDR head, a Ni payload and a KEi payload. Instead of carrying a SA payload which carries one or more cryptographic suites, the CREATE_CHILD_SA request carries a notification payload, for example a NEW_SPI notification. The NEW_SPI payload may have a SPI filed field which carries the new initiator SPI and does not carry a cryptographic suite. FIG. 7B shows an example of the rekey request packet format.

Alternatively, a Lightweight SA payload or other payload may be used to carry the new initiator SPI.

The NEW_SPI is a newly defined notification payload which carries the initiator SPI identifying the new IKE SA after rekey.

As an example, FIG. 7C illustrates a NEW_SPI for IKE.

As an example, FIG. 7D illustrates a Lightweight SA payload for the IKE. In the example, Lightweight SA payload contains single proposal payload and no transforms and attributes. According to this structure, value mentioned in "SPI" in case of IKE rekey is used as Initiator/Responder SPI for IKE SA.

714, the responder sends a CREATE_CHILD_SA response for rekeying an IKE SA to the initiator.

The CREATE_CHILD_SA response comprises a HDR head, an Nr payload and a KEr payload. Instead of carrying a SA payload which carries one or more cryptographic suites, the CREATE_CHILD_SA response carries a notification payload, for example a NEW_SPI notification. The NEW_SPI payload may have a SPI filed field which carries the new responder SPI and does not carry a cryptographic suite.

Operation 716, a new IKE SA is created.

Specifically, as discussed above, in this scenario, both the initiator and responder do not change their cryptographic suite. The new IKE SA is created according to the initiator SPI and the responder SPI, and the originally cryptographic suite used for the old SA being rekeyed. The new IKE SA is used to protect the IKE control packets. The new IKE SA, i.e., the rekeyed IKE SA inherits all the child SAs of the IKE SA, which means the existing child SAs that are linked with the old IKE SA will be moved to the new IKE SA after rekey is success.

Operation 718, the initiator sends an old IKE SA delete request to the responder to delete the old IKE SA.

The old IKE delete request may include a HDR and a D payload. The D payload may include information, such as a protocol identifier (ID) indicating the old SA to be deleted. The detailed implementation may refer to the operation 216.

Operation 718, upon receiving the old IKE SA delete request, the responder sends an old IKE SA delete response to the initiator.

The old IKE SA delete response may include a HDR and a D payload. The D payload may include information, such as a protocol ID indicating the SA to be deleted. The detailed implementation may refer to the operation 218.

By using the lightweight rekey approach as described in this embodiment, this NEW_SPI notification payload may save, for example, minimum 36 bytes, and the number of bytes saved will be increased proportionally in multiple cryptographic suite and this reduces processing of complex validation and thus processing of SA payload in the IKE rekey exchanges. For example, the size of the NEW_SPI notification payload may be in the range 12-16 bytes.

FIG. 8 illustrates the second scenario in which the responder changes the cryptographic suite that the responder currently used (e.g., the cryptographic suite used when the SA to be rekeyed is established). In this situation, the responder may sends a no proposal chosen notification payload in the CREATE_CHILD_SA response instead of a NEW_SPI notification or a SA payload carried the changed cryptographic suite to the initiator at operation 814. The no chosen notification payload may be a NO_PROPOSAL_CHOSEN payload to indicate that there is no matching cryptographic suite present in the cryptographic suite carried in CREATE_CHILD_SA request. Then, after the initiator receives the indication, the initiator will resend the CREATE_CHILD_SA request, but this time carrying the SA payload carrying the updated cryptographic suite to renegotiate the cryptographic suite with the responder until the initiator and the responder achieve an agreement on the cryptographic suite. The process of the renegotiation of the cryptographic suite may refer to any one of scenario as described in the disclosure. One example of the renegotiation is described below.

In this example, the operations 802-812 are the same as above operations 702-712. But at the operation 814, the CREATE_CHILD_SA response carries a HDR head, a notification payload. The notification payload may be a NO_PROPOSAL_CHOSEN type payload to indicate that there is no matching cryptographic suite present in the cryptographic suite carried in CREATE_CHILD_SA request. As an example, FIG. 7E illustrates the structure of the notification payload in which the notify message type is NO_PROPOSAL_CHOSEN. Thus, as for other new notifications disclosed herein, a conventional notification structure is used but with a new notification type. Then, after the initiator receives the indication, the initiator will resend the CREATE_CHILD_SA request which carries the SA payload carrying the updated cryptographic suite to renegotiate the cryptographic suite with the responder until the initiator and the responder achieve an agreement on the cryptographic suite. The process of the renegotiation of the cryptographic suite may refer to any one of scenario as described in the disclosure. One example of the renegotiation is described as below.

Then at operation 816, the initiator resends a CREATE_CHILD_SA request to the responder. The second CREATE_CHILD_SA request comprises a HDR head, N(REKEY_SA) payload, a SA payload a Ni payload, an optional KEi payload. The content of the Ni payload and the Kei payload may be referred to operation 212 and operation 712. The SA payload carries a SPI field which carries the new initiator SPI and one or more cryptographic suites the initiator proposed.

At operation 818, the responder sends a CREATE_CHILD_SA response to the initiator. The CREATE_CHILD_SA response carries a HDR head, an SA payload, an Nr payload, KEr payload. Operation 820, a new IKE SA is created. The implementation of this operation may refer to operation 716 as discussed above. Operation 820, the initiator sends an old IKE SA delete request to the responder to delete the old IKE SA.

The old IKE delete request may include a HDR and a D payload. The D payload may include information, such as protocol ID indicating the SA to be deleted. The detailed implementation may refer to the operation 216 and 718 as discussed above.

Operation 822, upon receiving the old IKE SA delete request, the responder sends an old IKE SA delete response to the initiator.

The old child SA delete response may include a HDR and a D payload. The D payload may include information, such as protocol ID indicating the SA to be deleted. The detailed implementation may refer to the operation 218 and 720 as discussed above.

FIG. 9 is a flowchart of rekeying the IKE SA according to an embodiment of the present disclosure. In this embodiment, the initiator changes the cryptographic suite.

There are three scenarios in this embodiment. The first scenario is that the responder does not change the cryptographic suite. In this scenario, for example, the initiator may have two supporting suites (e.g., weak cryptographic suite and strong cryptographic suite) and likes to change from the weak cryptographic suite to strong cryptographic suite, but the responder supports only weak cryptographic suite and does not want to change the cryptographic suite. In this case, the responder may not negotiate the cryptographic suite with the initiator and use the lightweight rekey approach. For example the responder may use the NEW_SPI notification or Lightweight SA payload or any other payload to contain the responder SPI.

The second scenario is that the responder changes the cryptographic suite. In this scenario, for example, when the initiator has two supporting suites (e.g., weak cryptographic suite and strong cryptographic suite) and likes to change the weak cryptographic suite to strong cryptographic suite, and the responder also wants to change the weak cryptographic suite (which is used when the SA to be rekeyed is first established) to the strong cryptographic suite. In this case, the responder may carry the SA payload carrying the strong cryptographic suite in the rekey response.

The third scenario is that the responder changes the cryptographic suite. In this scenario, for example, when the initiator has only one supporting suite (e.g., strong cryptographic suite) and wants to change the weak cryptographic suite to strong cryptographic suite, and the responder only supports the weak cryptographic suite. In this case, the responder sends a notification payload to indicate that there is no matching cryptographic suite present in the cryptographic suite carried in rekey request sent by the initiator. Then, after the initiator receives the indication, the initiator will resend the rekey request but this time carrying the SA payload carrying the updated cryptographic suite to renegotiate the cryptographic suite with the responder until the initiator and the responder achieve an agreement on the cryptographic suite. The process of the renegotiation of the cryptographic suite may refer to any one of scenario as described in the disclosure.

According to this embodiment, the IKE rekey process comprises the following operations. The detailed implementation of operations 902-910 may refer to the operations 702-710 as described in FIG. 7.

Operation 912, the initiator sends a CREATE_CHILD_SA request for rekeying an IKE SA to the responder. The CREATE_CHILD_SA request comprises a HDR head, a SA payload, a Ni payload and a KEi payload. The information carried in each payload may be referred to operation 112. In this case, for example, the SA payload carries two cryptographic suites, for example, a weak cryptographic suite and a strong cryptographic suite. Operation 914, the responder sends a CREATE_CHILD_SA response for rekeying an IKE SA to the initiator. The CREATE_CHILD_SA response comprises a HDR head, an Nr payload and a KEr payload. Instead of carrying a SA payload which carries cryptographic suites, the CREATE_CHILD_SA request carries a notification payload, for example a NEW_SPI notification. The NEW_SPI payload have a SPI field which carries the new responder SPI and does not carry a cryptographic suite. It should be understood that in the operation 914, the responder may, as an optional way, send the CREATE_CHILD_SA response carrying the SA payload which carries the cryptographic suite it currently used (i.e., it used when the SA is established) and the new responder SPI even though the responder does not wants to change the cryptographic suite it currently used.

According to the second scenario of this embodiment, when the responder wants to change the cryptographic suite it currently used, for example, changing from weak cryptographic suite to strong cryptographic suite. The CREATE_CHILD_SA response carries the SA payload carrying the changed cryptographic suite, i.e., the strong cryptographic suite, which is supported by the initiator.

The detailed implementation of operations 916-918 may refer to the operations 716-718 as described in FIG. 8, and operation 216-218 described in FIG. 2.

According to the third scenario of this embodiment, in which, for example, the initiator only supports one cryptographic suite (e.g., the strong cryptographic suite) and changes the cryptographic suite, e.g., from the weak cryptographic suite to strong suite. And the responder supports only weak cryptographic suite. In this scenario, the cryptographic suite in the responder is not matched with the cryptographic suite proposed by the initiator. After determining that there is no match with the cryptographic suite between the responder and the initiator, the responder may sends a no proposal chosen notification payload in the CREATE_CHILD_SA response instead of the SA payload to the initiator at operation 914. The no proposal chosen notification payload may be a NO_PROPOSAL_CHOSEN payload to indicate that there is no matching cryptographic suite present in the cryptographic suite carried in CREATE_CHILD_SA request. Then, after the initiator receives the indication, the initiator will resend the CREATE_CHILD_SA request which carries the SA payload carrying the updated cryptographic suite to renegotiate the cryptographic suite with the responder until the initiator and the responder achieve an agreement with the cryptographic suite. The process of the renegotiation of the cryptographic suite may refer to any one of scenario as described in the disclosure.

By introducing the NEW_SPI notification payload in IKE rekey, it may save, for example, minimum of 36 bytes for each and every IKE rekey and thus reduce processing of complex validation and also the processing of SA payload.

FIG. 10 is a flow chart of rekeying the IPSec SA according to an embodiment of the present disclosure. In this embodiment, the initiator does not change the cryptographic suite which is used when the SA to be rekeyed is established, for example, a strong cryptographic suite with higher cryptographic algorithm set. Regarding the flow information, the initiator may change the flow information or not change the flow information. When the initiator does not change the flow information, the rekey request does not need to carry the TS payload, in contrast, when the initiator changes the flow information, the rekey request will carries the flow information to reflect the changed flow information, such as, an address range, a port range, and an IP protocol ID etc. In this embodiment, there are two scenarios, and the first scenario is that the responder also does not change the cryptographic suite. The second scenario is that the responder changes the cryptographic suite.

It should be understood that in case of simultaneous rekeys of IKE SA and IPSec SA, the operations (i.e. Negotiation of IKEV2_REKEY_OPTIONAL_PAYLOAD_SUPPORTED in the IKE_SA_INIT or AUTH request message, and/or "NEW_SPI notification" or "Lightweight SA payload" or any other payload contains SPI to rekey the SA) remain similar as the embodiments described in this disclosure. If simultaneous rekeying, preferably the rekey processes are carried out independently without combining the messages.

According to the first scenario of this embodiment, the IPSec rekey process comprises the following operations.

Operation 1002-1010, the detailed implementation of operations 1002-1010 may refer to the operations 802-810 as described in FIG. 8.

Operation 1012, the initiator sends a CREATE_CHILD_SA request for rekeying a child SA to the responder.

The CREATE_CHILD_SA request comprises a HDR head, N(REKEY_SA) payload, a NEW_SPI payload, a Ni payload and optional a KEi payload and no TS payload when the initiator does not change the flow information. The N(REKEY_SA) payload carries a SPI to indicates which child SA to be rekeyed. The content of the Ni payload and the KEi payload may be referred to operation 212. Instead of carrying a SA payload which carries one or more cryptographic suites, the CREATE_CHILD_SA request carries a notification payload, for example the NEW_SPI notification payload. The NEW_SPI payload has a SPI fled field which carries the new initiator SPI and does not carry a cryptographic suite. Alternatively, a Lightweight SA payload or other payload may be used to carry the new initiator SPI.

Figure 10B:
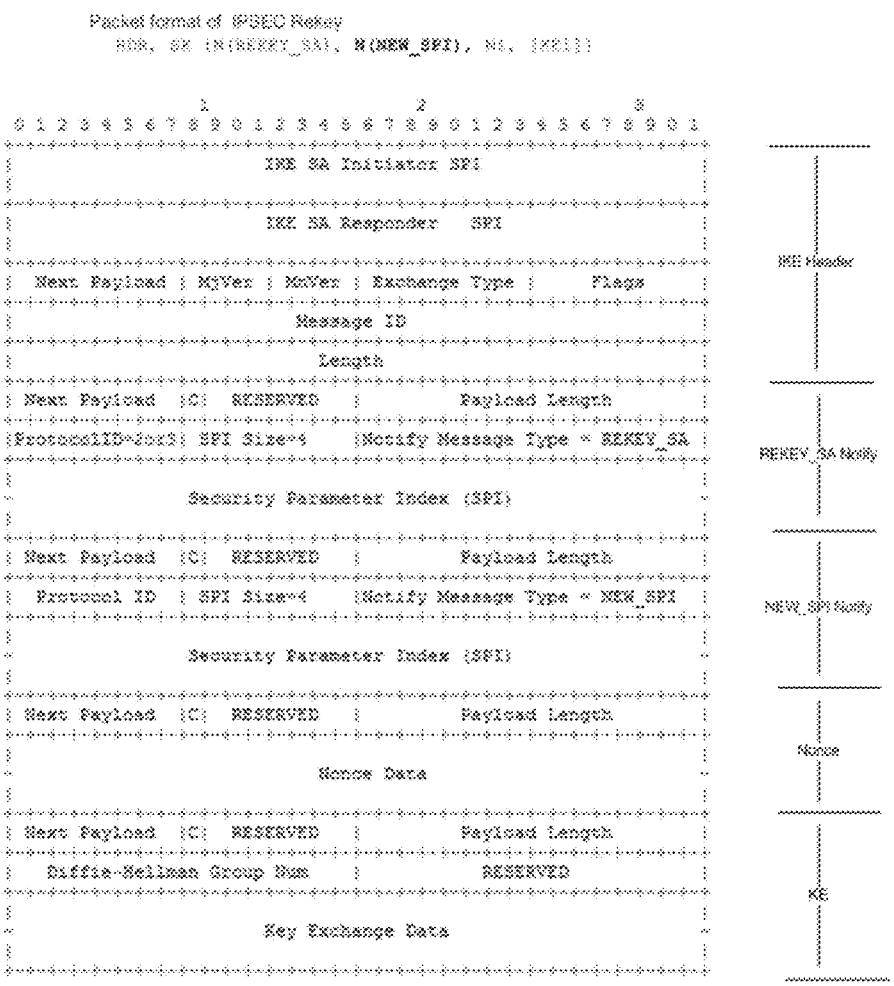
FIG. 10B illustrates an example of an IPSec SA rekey request packet format.

The NEW_SPI is a newly defined NOTIFY payload which carries the initiator SPI identifying the new IPSec SA after rekey. FIG. 10B shows an example of the rekey request packet format showing the new field e.g. NEW_SPI notify payload in the IPSec rekey request.

As an example, FIG. 10C illustrates a NEW_SPI for AH.

As an example, FIG. 10D illustrates two kinds of Lightweight SA which are newly defined payload for the IPSec SA. The uppermost Lightweight SA payload contains single proposal payload and no TRANSFORMS and attributes, and the lower Lightweight SA payload contains SA bundling as shown in FIG. 10D. When creating IPSec tunnel there are two ways. One is using either AH or ESP, and the other is using both AH and ESP which is also called SA bundling. The SA bundling is used when user want to use both AH and ESP at a time.

Value mentioned in "SPI" field in case of IPSec rekey is used as Inbound/Outbound SPI for AH/ESP SA.

Alternatively, when the initiator changes the flow configuration, for example, change the flow information, such as the IP address range for the new SA after rekey, the CREATE_CHILD_SA request may further carries the TS payload with exception of the payloads as mentioned above. The content of TS payload may be referred to the operation 212.

Operation 1014, the responder sends a CREATE_CHILD_SA response for rekeying a child SA to the initiator.

The CREATE_CHILD_SA response comprises a HDR head, a Nr payload and an optional KEr payload in which is contingent on whether the CREATE_CHILD_SA request carries the KEi payload. Instead of carrying a SA payload which carries one or more cryptographic suites, the CREATE_CHILD_SA response carries a notification payload, for example a NEW_SPI notification. The NEW_SPI payload may have a SPI field which carries the new responder SPI and does not carry a cryptographic suite.

As the CREATE_CHILD_SA request does not carry the TS payload carrying the flow information associated with the initiator, the responder may have the following two selections with respect to whether to carry the TS payload in the CREATE_CHILD_SA response.

The first selection is when there is no change in a flow information associated with the responder and the currently used flow information is still used for the new IPSec SA after rekey, the CREATE_CHILD_SA response does not carry a TS payload associated with the responder.

The second selection is when there is change in a flow information associated with the responder, the CREATE_CHILD_SA response carries a TS unacceptable notification. The TS unacceptable notification may be a TS_UNACCEPTABLE notification payload which is used to indicate that there is not matching for information between the initiator and the responder. Then, after the initiator receives the TS unacceptable notification, the initiator will resend the CREATE_CHILD_SA request which this time carries the TS payload carrying the updated flow information to renegotiate the flow information with the responder until the initiator and the responder achieve an agreement with the flow information. The process of the renegotiation of the flow information may refer to any one of scenario of cryptographic suite or flow information negotiation as described in the disclosure.

It should be noted that when any one of the cryptographic suite or flow information negotiation fails in the first negotiation turn, the two ends may renegotiate both the cryptographic suite and flow information negotiation in a second negotiation turn. In that case, the resend CREATE_CHILD_SA request may be with or without the SA payload to renegotiate the cryptographic suite together with the flow information negotiation with the responder. The details of the cryptographic suite may be referred to any one of scenario of IPSec SA cryptographic suite as described in the disclosure.

It should be understood that the cryptographic suite and flow information negotiation may be performed independently. In that case, the two ends may record the already achieved agreement of the cryptographic suite in the first negotiation turn. And the resent CREATE_CHILD_SA request in the second negotiation turn may not renegotiate the cryptographic suite through carrying with or without the SA payload.

When the initiator changes the flow information and accordingly the CREATE_CHILD_SA request carries the TS payload carrying the changed flow information associated with the initiator, the responder may have the following three selections with respect to whether to carry the TS payload in the CREATE_CHILD_SA response.

The first selection is when there is no change in a flow information associated with responder and the currently used flow information associated with the responder is present in the flow information associated with the initiator carried in the CREATE_CHILD_SA request, the CREATE_CHILD_SA response does not carry the TS payload.

The second selection is when there is change in the flow information associated with the responder and the responder selects flow information in the flow information associated with the initiator carried in the CREATE_CHILD_SA request as the flow information associated with the responder, the CREATE_CHILD_SA response carries the TS payload. As discussed in operation 212, the responder may choose a subset of the traffic proposed by the initiator, i.e., narrow the Traffic Selectors to some subset of the initiator's proposal. The responder may also send identical TS payloads to the initiator.

The third selection is when there is no matching flow information between the flow information the initiator proposed carried in the CREATE_CHILD_SA request and the flow information support, the CREATE_CHILD_SA response carries a TS unacceptable notification to indicate that there is no matching flow information. Then, after the initiator receives the notification, the initiator will resend the CREATE_CHILD_SA request which carries the TS payload carrying the updated flow information to renegotiate the flow information with the responder until the initiator and the responder achieve an agreement with the flow information. The process of the renegotiation of the flow information may refer to any one of scenario of cryptographic suite or flow information negotiation if need as described in the disclosure. As discussed above, the renegotiation process may take the cryptographic suite and flow information negotiation together or may only perform the failed flow information negotiation in the first negotiation turn without renegotiating the already achieved agreement of the cryptographic suite.

The detailed implementation of operations 1016-1020 may refer to the operations 716-720 as described in FIG. 8, and operations 216-220 described in FIG. 2.

In IPSec rekey, this NEW_SPI notification payload may save, for example, minimum 76 bytes, and the number of bytes saved will be increased proportionally in multiple cryptographic suite and/or TS payload. This reduces processing of complex validation and thus processing of SA, TSi and TSr payloads.

Figure 11:
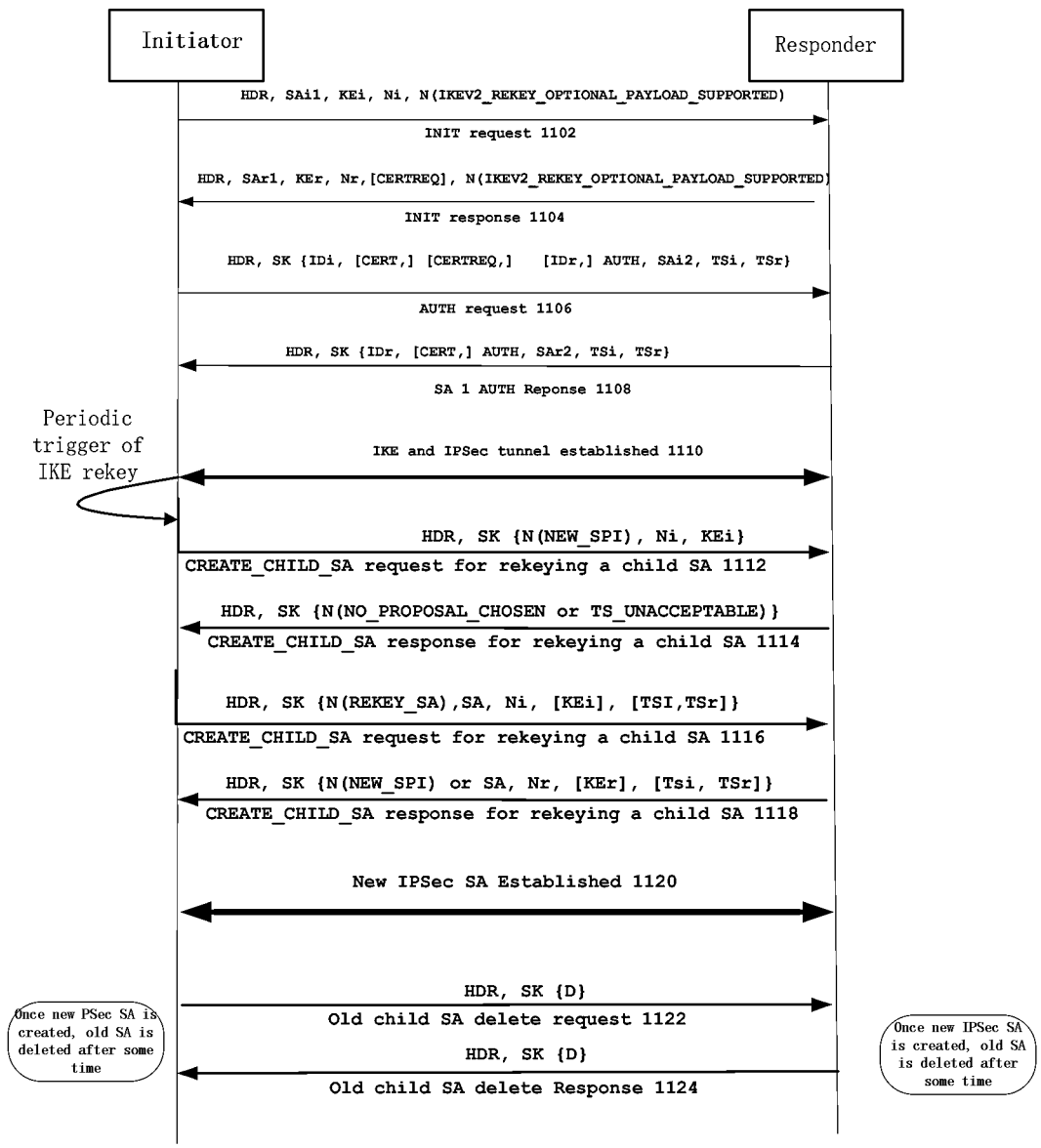
FIG. 11 illustrate a flowchart of rekeying the IPSec SA in a specific scenario according to one embodiment of the present disclosure.

In reference to FIG. 11, it illustrates the second scenario of this embodiment in which the responder changes the cryptographic suite, for example the responder changes the cryptographic suite that the responder currently used when the SA to be rekeyed is established.

In this scenario, the operations 1102-1112 are the same as above. But at the operation 1114, the CREATE_CHILD_SA response carries a HDR head, a no proposal chosen notification payload, or a TS unacceptable notification payload. The no proposal chosen notification payload may be a NO_PROPOSAL_CHOSEN payload to indicate that there is no matching cryptographic suite present in the cryptographic suite carried in CREATE_CHILD_SA request. The TS unacceptable notification payload may be a TS_UNACCEPTABLE notification to indicate that there is no matching flow information present in the flow information carried in CREATE_CHILD_SA request. Then, after the initiator receives the indication, the initiator will resend the CREATE_CHILD_SA request which carries the SA payload carrying the updated cryptographic suite to renegotiate the cryptographic suite with the responder until the initiator and the responder achieve an agreement with the cryptographic suite. The process of the renegotiation of the cryptographic suite may refer to any one of scenario as described in the disclosure. One example of the renegotiation is described as below.

At operation 1116, the initiator resends a CREATE_CHILD_SA request (which may be called a second CREATE_CHILD_SA request) to the responder.

The second CREATE_CHILD_SA request comprises a HDR head, N(REKEY_SA) payload, a SA payload, a Ni payload, an optional KEi payload, an optional TS payload which depends on whether the initiator changes the flow information. The N(REKEY_SA) payload carries a SPI to indicates which child SA to be rekeyed. The content of the Ni payload and the Kei payload may be referred to operation 212 and operation 1012. The SA payload carries a SPI field which carries the new initiator SPI and one or more cryptographic suites the initiator proposed.

At operation 1118, the responder sends a CREATE_CHILD_SA response to the initiator. The CREATE_CHILD_SA response carries a HDR head, an N(REKEY_SA) payload, a NEW_SPI notification payload or an SA payload, a NR payload, an optional KEr response (which depends on whether the CREATE_CHILD_SA request carries the Kei payload) and an optional TS payload carrying flow information associated with the responder (which depends on whether the responder changes the flow information associated with the responder). It should be understood that in the renegotiation process, the cryptographic suite and flow information negotiation may be performed according to any one of the cryptographic suite and flow information negotiation approach as described in this disclosure.

Operation 1120, the implementation of this operation may refer to operation 216 as discussed above.

Operation 1122, the initiator sends an old IPsec SA delete request to the responder to delete the old IPSec SA.

The old child delete request may include a HDR and a D payload. The D payload may include a SPI identifying the SA to be deleted. The detailed implementation may refer to the operation 216.

Operation 1124, upon receiving the old PSec SA delete request, the responder sends an old IPSec SA delete response to the initiator.

The old child SA delete response may include a HDR and a D payload. The D payload may include the SPI identifying the SA to be deleted. The detailed implementation may refer to the operation 218.

The above renegotiation process takes the cryptographic suite and flow information negotiation together, in which when any one of the cryptographic suite and flow information negotiation fails, the renegotiation process is triggered, and the renegotiation process will renegotiate both the cryptographic suite and flow information. As discussed above, the cryptographic suite negotiation and the flow information negotiation may be performed separately.

The following described the flow information negotiation in the second scenario.

When the CREATE_CHILD_SA request at operation 1112 does not carry the TS payload carrying the flow information associated with the initiator, the responder may have the following two selections with respect to whether to carry the TS payload in the CREATE_CHILD_SA response at operation 1114.

The first selection is when there is no change in a flow information associated with the responder and the currently used flow information is still used for the new IPSec SA after rekey, the CREATE_CHILD_SA response does not carries a TS payload associated with the responder.

The second selection is when there is change in a flow information associated with the responder, the CREATE_CHILD_SA response carries a TS unacceptable notification. The TS unacceptable notification may be a TS_UNACCEPTABLE notification payload which is used to indicate that there is not matching for information between the initiator and the responder. Then, after the initiator receives the TS unacceptable notification, the initiator will resend the CREATE_CHILD_SA request which carries the TS payload carrying the updated flow information to renegotiate the flow information with the responder until the initiator and the responder achieve an agreement with the flow information. The process of the renegotiation of the flow information may refer to any one of scenario of cryptographic suite or flow information negotiation if need as described in the disclosure.

It should be noted that when any one of the cryptographic suite or flow information negotiation fails in the first negotiation turn, the two ends may renegotiate both the cryptographic suite and flow information negotiation in the second negotiation turn. In that case, the resend CREATE_CHILD_SA request may be with or without the SA payload to renegotiate the cryptographic suite together with the flow information negotiation with the responder. The detailed of the cryptographic suite may be referred to any one of scenario of IPSec SA cryptographic suite if need as described in the disclosure.

It should be understood that the cryptographic suite and flow information negotiation may be performed independently. In that case, the two ends may records the already achieved agreement of the cryptographic suite in the first negotiation turn. And the resend CREATE_CHILD_SA request in the second negotiation turn may not renegotiate the cryptographic suite through carrying with or without the SA payload.

It should be understood that during the second rekey request with updated cryptographic suite or TS, the device either can reuse the SPI in the NEW_SPI notify or Light Weight SA payload or completely generate a New SPI during the second rekey request with new cryptographic suites. This approach may apply in the renegotiation process as discussed in the disclosure.

When the initiator changes the flow information and accordingly the CREATE_CHILD_SA request carries the TS payload carrying the changed flow information associated with the initiator, the responder may have the following three selections with respect to whether to carry the TS payload in the CREATE_CHILD_SA response.

The first selection is when there is no change in a flow information associated with responder and the currently used flow information associated with the responder is present in the flow information associated with the initiator carried in the CREATE_CHILD_SA request, the CREATE_CHILD_SA response does not carry the TS payload.

The second selection is when there is change in the flow information associated with the responder and the responder selects flow information in the flow information associated with the initiator carried in the CREATE_CHILD_SA request as the flow information associated with the responder, the CREATE_CHILD_SA response carries the TS payload. As discussed in operation 212, the responder may choose a subset of the traffic proposed by the initiator, i.e., narrow the Traffic Selectors to some subset of the initiator's proposal. The responder may also send identical TS payloads to the initiator.

The third selection is when there is no matching flow information between the flow information the initiator proposed carried in the CREATE_CHILD_SA request and the flow information support, the CREATE_CHILD_SA response carries a TS unacceptable notification to indicate that there is no matching flow information. Then, after the initiator receives the notification, the initiator will resend the CREATE_CHILD_SA request which carries the TS payload carrying the updated flow information to renegotiate the flow information with the responder until the initiator and the responder achieve an agreement with the flow information. The process of the renegotiation of the flow information may refer to any one of scenario of cryptographic suite or flow information negotiation if need as described in the disclosure.

As discussed above, the renegotiation process may take the cryptographic suite and flow information negotiation together or may only perform the failed negotiation in the first negotiation turn.

Figure 12:
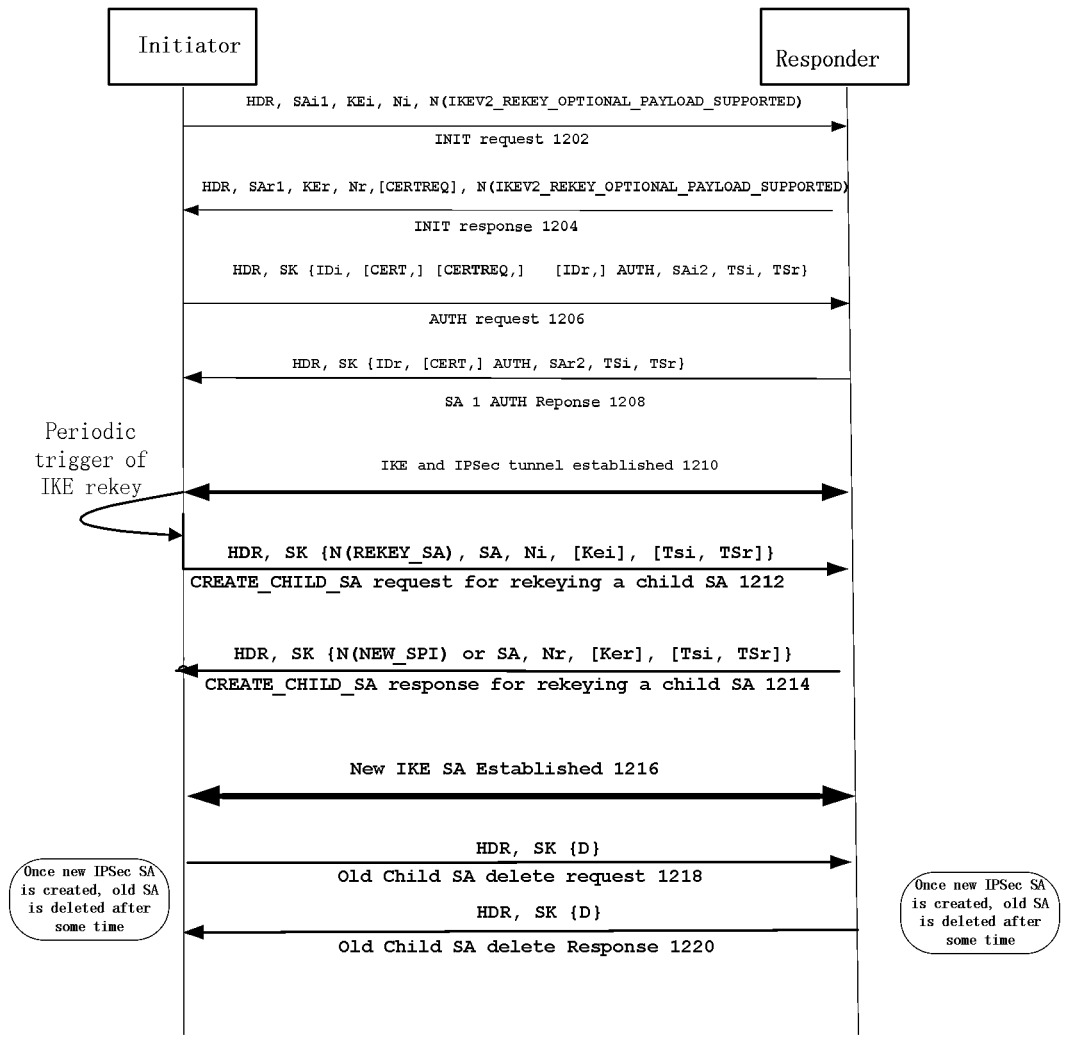
FIG. 12 illustrate another flowchart of rekeying the IPSec SA using the lightweight rekey approach according to another embodiment of the present disclosure.

FIG. 12 is a flow chart of rekeying the IPSec SA according to an embodiment of the present disclosure. In this embodiment, the initiator changes the cryptographic suite which is used when the SA to be rekeyed is established, for example, changing from a weak cryptographic suite to a stronger e.g. a higher cryptographic suite with higher cryptographic algorithm set. Regarding the flow information, the initiator may change the flow information or may not change the flow information. When the initiator does not change the flow information, the rekey request does not need to carry the TS payload. In contrast, when the initiator changes the flow information, the rekey request will carry the flow information to reflect the changed flow information, such as any of an address range, a port range, and an IP protocol ID etc.

There are three scenarios in this embodiment. The first scenario is that the responder does not change the cryptographic suite, e.g., the cryptographic suite. In this scenario, the responder may not negotiate the cryptographic suite with the initiator and use the lightweight rekey approach. For example, the responder may use the NEW_SPI notification or Lightweight SA payload or any other payload to contain the responder SPI. The second scenario is that the responder changes the cryptographic suite. In this case, the responder may carry the SA payload carrying the changed cryptographic suite in the rekey response. The third scenario is that the cryptographic suite(s) carried in the rekey request is not matched with the cryptographic suite supported by the responder. In this case, the responder carries a notification payload to indicate that there is no matching cryptographic suite present in the cryptographic suite carried in rekey request sent by the initiator. Then the two ends will renegotiate the cryptographic suite until achieving an agreement with the cryptographic suite. The detailed negotiation of the cryptographic suite may be referred to the detailed descriptions corresponding to FIG. 9.

Referring back to FIG. 12, it illustrates the flow chart according to this embodiment which comprises the following operations.

The detailed implementation of operations 1202-1210 may refer to the operations 802-810 as described in FIG. 8.

Operation 1212, the initiator sends a CREATE_CHILD_SA request for rekeying an IPSec SA to the responder. The CREATE_CHILD_SA request comprises a HDR head, N(REKEY_SA) payload carrying a SPI to indicates which child SA to be rekeyed, a SA payload carrying one or more cryptographic suites and a new initiator SPI, a Ni payload, an optional KEi payload, and an optional TS payload (which depends on whether the initiator changes the flow information associated with the initiator). The detailed information carried in each payload may be referred to operation 112.

Operation 914, the responder sends a CREATE_CHILD_SA response for rekeying an IPSec SA to the initiator. The CREATE_CHILD_SA response comprises a HDR head, a NEW_SPI notification payload or SA payload (which depend on whether the responder changes the cryptographic suite associated with the responder), a Nr payload, an optional KEr payload (which depends on whether the CREATE_CHILD_SA request carries the Kei payload), and an optional TS payload (which depends on whether the responder changes the flow information associated with the responder). The NEW_SPI payload may have a SPI field which carries the new responder SPI and does not carry a cryptographic suite.

It should be understood that in the operation 1214, the responder may, as an optional way, send the CREATE_CHILD_SA response carrying the SA payload which carries the cryptographic suite it currently used (i.e., it used when the SA is established) and the new responder SPI even though the responder does not change the cryptographic suite it currently used.

According to the second scenario of this embodiment, when the responder changes the cryptographic suite it currently used. The CREATE_CHILD_SA response carries the SA payload carrying the changed cryptographic suite which is also supported by the initiator.

The detailed implementation of operations 1216-1218 may refer to the operations 816-818 as described in FIG. 8, and operation 216-218 described in FIG. 2.

According to the third scenario of this embodiment, in which, the cryptographic suite in the CREATE_CHILD_SA request is not matched with the cryptographic suite to which the responder wants to change. In this scenario, the responder may sends a no proposal chosen notification payload in the CREATE_CHILD_SA response instead of the SA payload to the initiator at operation 1214. The no proposal chosen notification payload may be a NO_PROPOSAL_CHOSEN payload to indicate that there is no matching cryptographic suite present in the cryptographic suite carried in CREATE_CHILD_SA request. Then, after the initiator receives the indication, the initiator will resend the CREATE_CHILD_SA request which carries the SA payload carrying the updated cryptographic suite to renegotiate the cryptographic suite with the responder until the initiator and the responder achieve an agreement with the cryptographic suite. The process of the renegotiation of the cryptographic suite may refer to any one of scenario if need as described in the disclosure.

The following described the flow information negotiation in this embodiment.

When the CREATE_CHILD_SA request at operation 1212 does not carry the TS payload carrying the flow information associated with the initiator, the responder may have the following two selections with respect to whether to carry the TS payload in the CREATE_CHILD_SA response at operation 1214.

The first selection is when there is no change in a flow information associated with the responder and the currently used flow information is still used for the new IPSec SA after rekey, the CREATE_CHILD_SA response does not carries a TS payload associated with the responder.

The second selection is when there is change in a flow information associated with the responder, the CREATE_CHILD_SA response carries a TS unacceptable notification. The TS unacceptable notification may be a TS_UNACCEPTABLE notification payload which is used to indicate that there is not matching for information between the initiator and the responder. Then, after the initiator receives the TS unacceptable notification, the initiator will resend the CREATE_CHILD_SA request which carries the TS payload carrying the updated flow information to renegotiate the flow information with the responder until the initiator and the responder achieve an agreement with the flow information. The process of the renegotiation of the flow information may refer to any one of the cryptographic suite or flow information negotiation approach if need as described in the disclosure.

It should be noted that when any one of the cryptographic suite or flow information negotiation fails in the first negotiation turn, the two ends may renegotiate both the cryptographic suite and flow information negotiation in the second negotiation turn. In that case, the resend CREATE_CHILD_SA request may be with or without the SA payload to renegotiate the cryptographic suite together with the flow information negotiation with the responder.

It should be understood that the cryptographic suite and flow information negotiation may be performed independently. In that case, the two ends may records the already achieved agreement of the cryptographic suite in the first negotiation turn. And the resend CREATE_CHILD_SA request in the second negotiation turn may not renegotiate the cryptographic suite through carrying with or without the SA payload.

When the initiator changes the flow information and accordingly the CREATE_CHILD_SA request carries the TS payload carrying the changed flow information associated with the initiator, the responder may have the following three selections with respect to whether to carry the TS payload in the CREATE_CHILD_SA response.

The first selection is when there is no change in a flow information associated with responder and the currently used flow information associated with the responder is present in the flow information associated with the initiator carried in the CREATE_CHILD_SA request, the CREATE_CHILD_SA response does not carry the TS payload.

The second selection is when there is change in the flow information associated with the responder and the responder selects flow information in the flow information associated with the initiator carried in the CREATE_CHILD_SA request as the flow information associated with the responder, the CREATE_CHILD_SA response carries the TS payload. As discussed in operation 212, the responder may choose a subset of the traffic proposed by the initiator, i.e., narrow the Traffic Selectors to some subset of the initiator's proposal. The responder may also send identical TS payloads to the initiator.

The third selection is when there is no matching flow information between the flow information the initiator proposed carried in the CREATE_CHILD_SA request and the flow information support, the CREATE_CHILD_SA response carries a TS unacceptable notification to indicate that there is no matching flow information. Then, after the initiator receives the notification, the initiator will resend the CREATE_CHILD_SA request which carries the TS payload carrying the updated flow information to renegotiate the flow information with the responder until the initiator and the responder achieve an agreement with the flow information. The process of the renegotiation of the flow information may refer to any one of scenario of cryptographic suite or flow information negotiation if need as described in the disclosure.

As discussed above, the renegotiation process may take the cryptographic suite or flow information negotiation together or may only perform the failed negotiation in the first negotiation turn.

By introducing the NEW_SPI notification payload in IPSEC rekey, or not carry the TS payload, it may save, for example, minimum 76 bytes for each and every IPSec rekey and thus reducing processing of complex validation and also processing of SA, TSi and TSr payloads.

Figure 13:
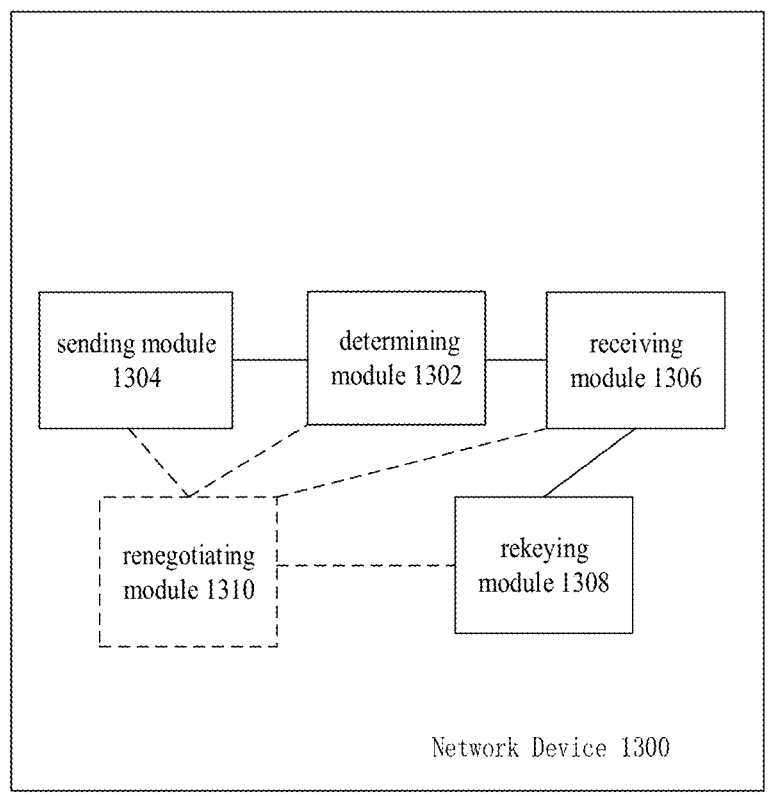
FIG. 13 illustrates a schematic diagram of a network device acting as initiator for rekeying SA according to an embodiment of the present disclosure.

Referring to FIG. 13, it illustrates a schematic diagram of a network device 1300 according to an embodiment of the disclosure. The network device is configured to rekey a security association (SA) in a network system comprising a first network device (e.g., the initiator as described in the above embodiments) and a second network device (e.g., the responder described in the above embodiments), and an IKE tunnel and IPSec tunnel are established between the first network device and the second network device. In this embodiment, the network device is acting as the first network device and the network device comprises a determining module 1302, a sending module 1304, a receiving module 1306, and a rekeying module 1308.

The determining module 1302 is configured to determine whether there is change in a cryptographic suite associated with the first network device. The sending module 1304 is configures to send a first rekey request to the second network device for rekeying SA when there is no change in the cryptographic suite associated with the first network device, wherein the first rekey request carries a first SPI and does not carry a cryptographic suite associated with the first network device. The receiving module 1306 is configured to receive a first rekey response from the second network device, wherein the first rekey response carries a second SPI and does not carry a cryptographic suite associated with the second network device when there is no change in a cryptographic suite associated with the second network device. The rekeying module 1308 is configured to rekey the SA according to the first SPI and second SPI when there is no change in the cryptographic suite associated with the first network device and in the cryptographic suite associated with the second network device. The detailed of the implementation of each modules in the network device of this embodiment may refer to the implementations of initiator in the embodiments of FIGS. 7 and 10.

In another embodiment, the network device further comprises a renegotiating module 1310. When there is change in the cryptographic suite associated with the second network device, the first rekey response carries a no proposal chosen notification from the second network device. The renegotiating module 1310 is configured to renegotiate with the second network device until obtaining a negotiated cryptographic suite, and the rekeying module 1308 is configured to rekey the SA further according to the renegotiated cryptographic suite. It should be understood that the renegotiating module 1310 is configured to determine whether to renegotiate the cryptographic suite or the flow information in the case of IPSec SA rekey, the renegotiation process is performed through the sending module 1304 and the receiving module 1306. In some embodiments, the renegotiating module 1310 may be incorporated into the determining module 1302. An example of the no proposal chosen notification may be a NO_PROPOSAL_CHOSEN notification payload. The detailed of the renegotiation implementation of the network device of this embodiment may refer to the implementations of initiator in the embodiments of FIGS. 8 and 11.

It would be understood by that the network device 1300 may implement the operations performed by the initiator in the above embodiments of FIGS. 1-12. The detailed implementation may refer to the embodiments as described above. Here, there is no need to describe one by one.

Figure 14:
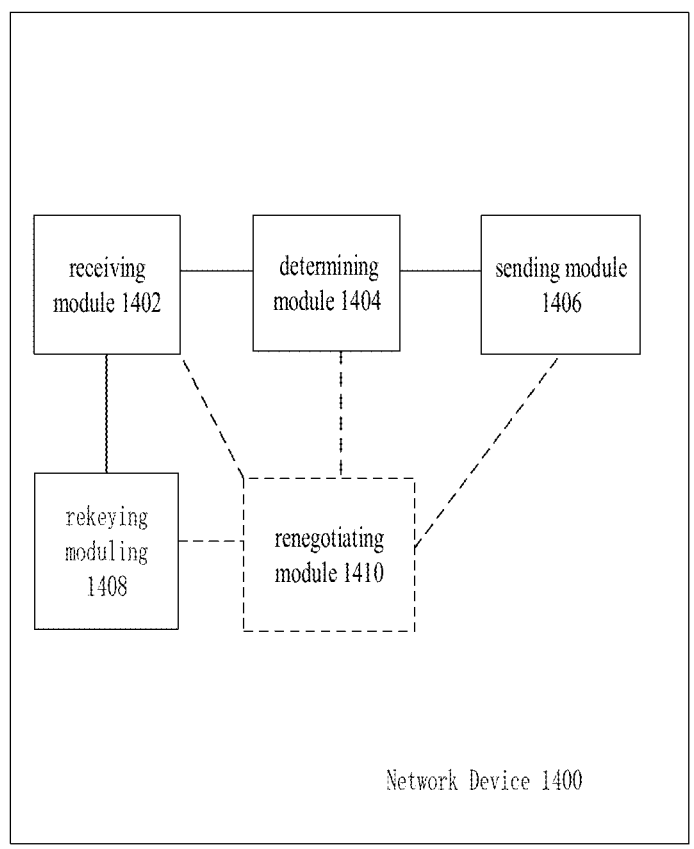
FIG. 14 illustrates a schematic diagram of a network device acting as responder for rekeying SA according to an embodiment of the present disclosure.

Referring to FIG. 14, it illustrates a schematic diagram of another network device 1400 according to an embodiment of the disclosure. The network device 1400 is configured to rekey a security association (SA) in a network system comprising a first network device (e.g., the initiator as described in the above embodiment) and a second network device (e.g., the responder described in the above embodiment), an IKE tunnel and IPSec tunnel are established between the first network device and the second network device. In this embodiment, the network device is configured as the second network device and the network device comprises a receiving module 1402, a determining module 1404, a sending module 1406, and a rekeying module 1408.

The receiving module 1402 is configured to receive a first rekey request from the first network device for rekeying SA, and the first rekey request carries a first SPI and does not carry a cryptographic suite associated with the first network device. The determining module 1404 is configured to determine whether there is change in a cryptographic suite associated with the second network device. The sending module 1406 is configured to send a first rekey response to the first network device, and the first rekey response carries a second SPI and does not carry a cryptographic suite associated with the second network device when there is no change in the cryptographic configuration associated with the second network device. Accordingly, the rekeying module 1408 is configured to rekey the SA according to the first SPI and second SPI. The detailed of the implementation of each modules in the network device of this embodiment may refer to the descriptions of FIGS. 7 and 10.

In another embodiment of the network device 1400 is that the first rekey response carries a no proposal chosen notification when there is change in the cryptographic suite associated with the second network device. As such, the receiving module 1402 is further configured to receive a second rekey request from the first network device for rekey the SA carrying the first SPI and the cryptographic suite associated with the first network device. And the sending module 1406 is further configured to send a second rekey response which carries another no proposal chosen notification to indicate that there is no matching cryptographic suite present in the cryptographic suite associated with the first network device carried in the second rekey request. The network device further comprises a renegotiating module 1410 which is configured to renegotiate with the first network device until a negotiated cryptographic suite is obtained. Accordingly, the SA is rekeyed further according to the renegotiated cryptographic suite. It should be understood that the renegotiating module 1410 is configured to determine whether to renegotiate the cryptographic suite or the flow information in the case of IPSec SA rekey, the renegotiation process is performed through the sending module 1406 and the receiving module 1402. In some embodiments, the renegotiating module 1410 may be incorporated into the determining module 1404. The detailed of the renegotiation implementation of the network device of this embodiment may refer to the implementations of initiator in the embodiments of FIGS. 8 and 11.

It would be understood that the network device 1400 may implement the operations performed by the responder in the above embodiments of FIGS. 1-12. The detailed implementation may refer to the embodiments as described above. Here, there is no need to describe one by one.

Figure 15:
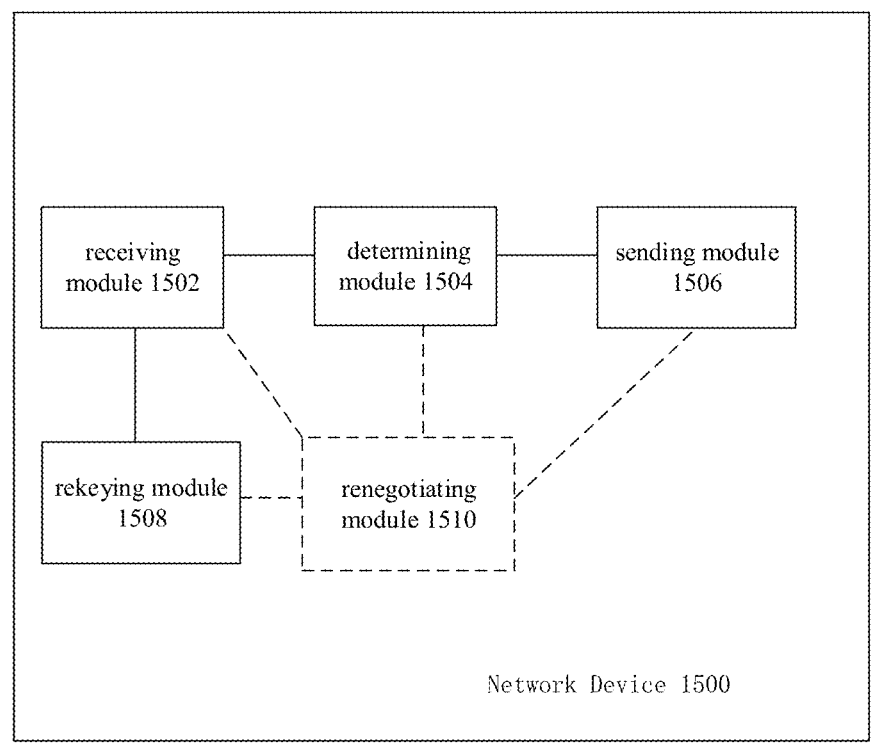
FIG. 15 illustrates a schematic diagram of a network device acting as responder for rekeying SA according to another embodiment of the present disclosure.

Referring to FIG. 15, it illustrates a schematic diagram of another network device 1500 according to an embodiment of the disclosure. The network device 1500 is configured to rekey a security association (SA) in a network system comprising a first network device (e.g., the initiator as described in the above embodiment) and a second network device (e.g., the responder described in the above embodiment), an IKE tunnel and IPSec tunnel are established between the first network device and the second network device. In this embodiment, the network device is configured as the second network device and the network device comprises a receiving module 1502, a determining module 1504, a sending module 1506, and a rekeying module 1508.

The receiving module 1502 is configured to receive a first rekey request from the first network device for rekeying SA, wherein the first rekey request carries a first SPI and a cryptographic suite associated with the first network device. The determining module 1504 is configured to determine whether there is change in a cryptographic suite associated with the second network device. The sending module 1506 is configured to send a first rekey response to the first network device, wherein the first rekey response carries a second SPI and does not carry a cryptographic suite associated with the second network device when there is no change in the cryptographic suite associated with the second network device. The rekeying module is configured to rekey the SA according to the first SPI and second SPI. The implementation of the rekey may refer to the above detailed description, for example, in FIGS. 6-12.

In another embodiment of the network device 1500 is that the first rekey response carries a no proposal chosen notification to indicate that there is no matching cryptographic suite present in the cryptographic suite associated with the first network device carried in the first rekey request. In this case, the network device 1500 further comprises a renegotiating module 1510 which is configured to renegotiate with the first network device until a negotiated cryptographic suite is obtained. Accordingly the SA is rekeyed further according to the negotiated cryptographic suite. A person of ordinary skill in the art would understand that the renegotiating module 1510 is configured to determine whether to renegotiate the cryptographic suite or the flow information in the case of IPSec SA rekey, the renegotiation process is performed through the sending module 1506 and the receiving module 1502. In some embodiments, the renegotiating module 1510 may be incorporated into the determining module 1504. The detailed of the renegotiation implementation in the network device 1500 of the above embodiment may refer to the implementations of responder in the embodiments of FIGS. 9 and 12.

It would be understood by those skilled in the art that the network device 1500 may implement the operations performed by the responder in the above embodiments of FIGS.

1-12. The detailed implementation may refer to the embodiments as described above. Here, there is no need to describe one by one.

Figure 16:
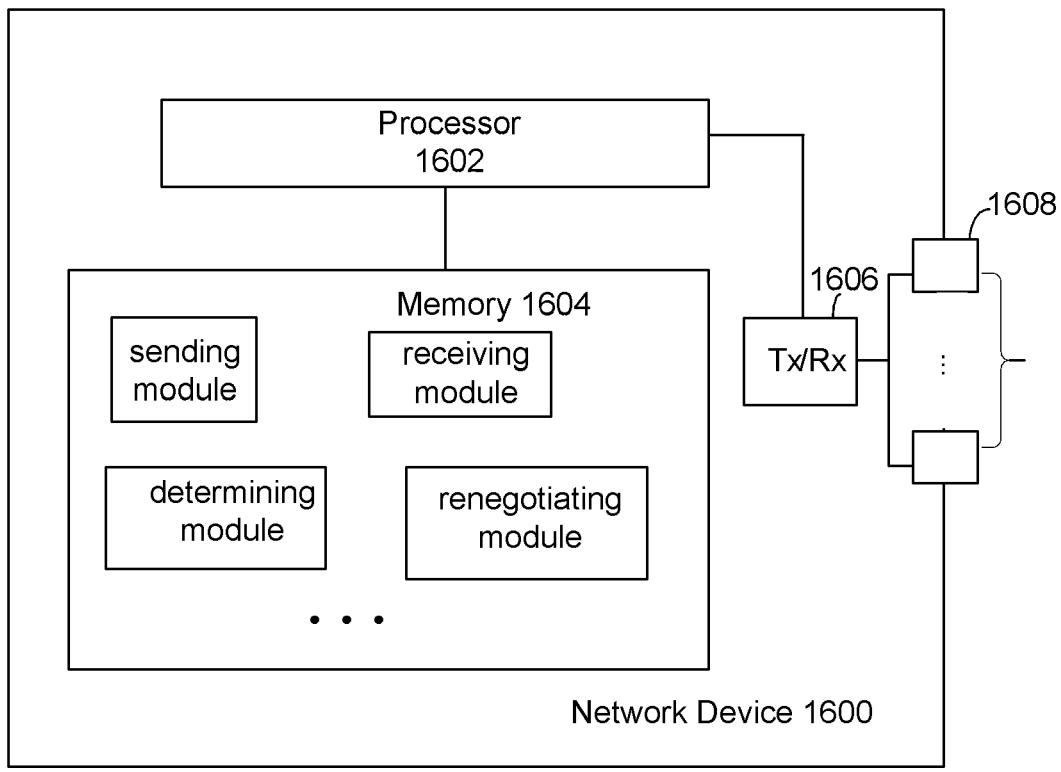
FIG. 16 illustrates a schematic diagram of a network device acting as initiator or responder for rekeying SA according to embodiments of the present disclosure.

Referring to FIG. 16, it illustrates a schematic diagram of another network device 1600 according to an embodiment of the disclosure. The network device 1600 is configured to rekey a security association (SA) in a network system comprising a first network device (e.g., the initiator as described in the above embodiment) and a second network device (e.g., the responder described in the above embodiment), an IKE tunnel and IPSec tunnel are established between the first network device and the second network device. In some embodiments, network device 1600 may act as the initiator as described in the embodiments of FIGS. 1-12 and perform the operations of the initiator described in the embodiments of FIGS. 1-12. In other embodiments, the network device 1600 may act as the responder as described in the embodiments of FIGS. 1-12 and perform the operations of the responder described in the embodiments of FIGS. 1-12.

The network device comprises a processor 1602, a memory 1604 coupled to processor 1602, a transceivers (Tx/Rx) 1606, and ports 1608 coupled to Tx/Rx 1606. The processor 1602 may be implemented as a general processor or may be part of one or more application specific integrated circuits (ASICs) and/or digital signal processors (DSPs). The processor 1602 may refer to a single process or a plurality of processors. Memory 1604 may include a cache for temporarily storing content, e.g., a random-access memory (RAM). Additionally, the memory 1604 may include a long-term storage, e.g., a read-only memory (ROM). When acting as the initiator, the processor 1602 is configured to perform the operations of the initiator described in the embodiments of FIGS. 1-12. When acting as the responder, the processor 1602 is configured to perform the operations of the responder described in the embodiments of FIGS. 1-12.

Furthermore, in one embodiment, the memory 1604 may include multiple software modules, such as the modules as described in the embodiments of FIG. 13. In another embodiment, the memory 1604 may include multiple software modules, such as the modules as described in the embodiments of FIG. 14. In a further embodiment, the memory 1604 may include multiple software modules, such as the modules as described in the embodiments of FIG. 15.

By executing instructions of the software modules, the processor 1602 may perform a plurality of operations. In some embodiments, when a module is configured to perform an operation, it may actually mean that the processor 1602 is configured to execute instructions in the module to perform the operation. By executing the instructions in the memory 1604, the processor 1602 may perform, completely or partially, all operations performed by the initiator or the responder as describes in FIGS. 1-12.

Figure 17:
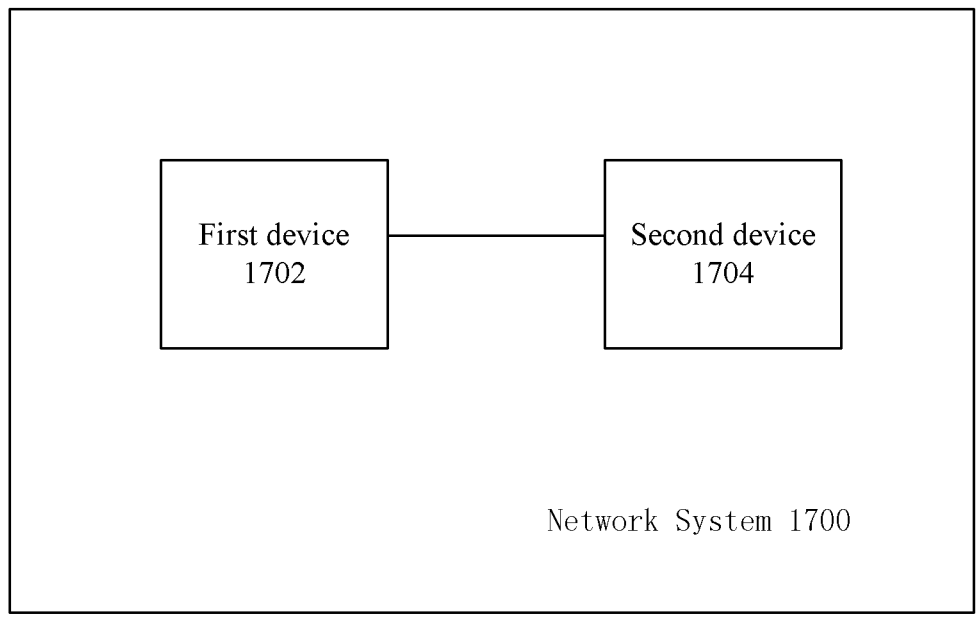
FIG. 17 illustrates a schematic diagram of a network system for rekeying SA according to embodiments of the present disclosure.

Referring to FIG. 17, it illustrates a schematic diagram of a network system 1700. The network system 1700 may comprise at least a first network device 1702 (i.e., the initiator) and a second network device 1704 (i.e., the responder). The first network device 1702 may be the network device 1300 as described in the embodiments of FIG. 13. The second network device 1704 may be the network device 1400 or network device 1500 as described in the embodiments of FIGS. 14 and 15. In another embodiment, the first network device may be the network device 1600 which act as the initiator as described in the embodiments of FIGS. 1-12 and performs the operations of the initiator described the embodiments of FIGS. 1-12. And the second network device may be the network device 1600 which acts as the responder as described in the embodiments of FIGS. 1-12 and performs the operations of the responder described in the embodiments of FIGS. 1-12.

A person skilled in the art may understand after reading the disclosure that any known or new algorithms by be used for the implementation of the present disclosure. However, it is to be noted that, the present disclosure provides a method to achieve the above mentioned benefits and technical advancement irrespective of using any known or new algorithms.

A person of ordinary skill in the art may be aware after reading the disclosure that in combination with the examples described in the embodiments disclosed in this specification, units and algorithm steps may be implemented by electronic hardware, or a combination of computer software and electronic hardware. Whether the functions are performed by hardware or software depends on the particular inventions and design constraint conditions of the technical solution. After reading the disclosure, a person skilled in the art may use different methods to implement the described functions for each particular invention, but it should not be considered that the implementation goes beyond the scope of the present disclosure.

In the several embodiments provided in the present disclosure, it should be understood that the disclosed system and method may be implemented in other manners. For example, the described network device embodiment is merely exemplary. For example, the unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. The functions may be expressed in computer code forming a computer program product, which may instruct suitable hardware to perform the functions. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer node (which may be a personal computer, a server, or a network node i.e. a processor) to perform all or a part of the steps of the methods described in the embodiment of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The invention claimed is:

1. A method for rekeying a security association (SA) in a network system including a first network device and a second network device, comprising:
   establishing an Internet Key Exchange (IKE) tunnel and an Internet Protocol Security (IPSec) tunnel between the first network device and the second network device; and
   negotiating to rekey a SA by:
      sending, by the first network device, a first rekey request to the second network device for rekeying a SA, wherein the first rekey request carries a first Security Parameter Index (SPI) and a cryptographic suite associated with the first network device;
      receiving, by the first network device, a first rekey response from the second network device, wherein the first rekey response carries a second SPI and does not carry a cryptographic suite associated with the second network device when there is no change in a cryptographic suite associated with the second network device; and
   wherein:
      when the SA is an IPSec SA which is a child SA of an IKE SA, the first rekey request does not carry a Traffic Selector (TS) payload carrying flow information associated with the first network device when there is no change in a flow information associated with the first network device; wherein the first rekey response does not carry a TS payload associated with the second network device when there is no change in a flow information associated with the second network device; and
   wherein rekeying, by the first network device, the SA without changing flow information associated with the SA.

2. The method of claim 1, wherein when the first rekey response carries a no proposal chosen notification from the second network device when there is no matching cryptographic suite present in the cryptographic suite associated with the first network device carried in the first rekey request, the method further comprises:
   renegotiating, by the first network device, with the second network device until a negotiated cryptographic suite is obtained; and
   wherein rekeying, by the first network device, the SA is further according to the negotiated cryptographic suite.

3. The method of claim 1, wherein renegotiating with the second network device until a negotiated cryptographic suite is obtained comprises:
   sending, by the first network device, an updated cryptographic suite associated with the first network device to the second network device to negotiate with the second network device until the negotiated cryptographic suite is obtained.

4. The method of claim 1, wherein the no proposal chosen notification is a NO_PROPOSAL_CHOSEN notification payload.

5. The method of claim 2, wherein:
   the first rekey response does not carry a TS payload carrying flow information associated with the second network device when there is no change in a flow information associated with the second network device and currently used flow information associated with the second network device is present in the flow information associated with the first network device carried in the first rekey request; and
   rekeying, by the first network device, the SA is further according to the currently used flow information associated with the second network device.

6. The method of claim 1, wherein:
   the first rekey response carries a TS payload carrying flow information associated with the second network device when there is change in the flow information associated with the second network device and the second network device selects flow information in the flow information associated with the first network device carried in the first rekey request as the flow information associated with the second network device; and
   rekeying, by the first network device, the SA is further according to the selected flow information.

7. The method of claim 1, wherein when the SA is an IPSec SA which is a child SA of an IKE SA, the first rekey request further carries a TS payload carrying flow information associated with the first network device when there is a change in a flow information associated with the first network device; wherein the first rekey response carries a TS unacceptable notification to indicate that there is no matching flow information present in the flow information associated with the first network device carried in the first rekey request; and
   wherein the method further comprises renegotiating, by the first network device, with the second network device until a negotiated flow information is obtained; and
   wherein rekeying, by the first network device, the SA is further according to the negotiated flow information.

8. The method of claim 1, wherein when the SA is an IPSec SA which is a child SA of an IKE SA, the first rekey request does not carry a TS payload carrying flow information associated with the first network device when there is no change in a flow information associated with the first network device; wherein the first rekey response carries a TS unacceptable notification when there is change in a flow information associated with the second network device;
   wherein the method further comprises renegotiating, by the first network device, with the second network device until a negotiated flow information is obtained; and
   wherein rekeying, by the first network device, the SA is further according to the negotiated flow information.

9. The method of claim 1, wherein:
   the first rekey request is CREATE_CHILD_SA request for rekeying a child SA, and the CREATE_CHILD_SA request carries a NEW_SPI notification payload carrying the first SPI or carries a Lightweight SA payload carrying the first SPI, and the CREATE_CHILD_SA request carries a TS payload carrying flow information associated with the first network device; and
   the first rekey response is CREATE_CHILD_SA response for rekeying an IKE SA, and the CREATE_CHILD_SA response carries a NEW_SPI notification payload carrying the second SPI or carries another Lightweight SA payload carrying the second SPI, and the CREAT- E_CHILD_SA response does not carry a TS payload carrying flow information associated with the second network device.

10. The method of claim 1 wherein before sending the first rekey request to the second network device for rekeying the SA, the method further comprises:
sending, by the first network device, a lightweight rekey support notification to the second network device to indicate that the first network device supports for a lightweight rekey; and
receiving, by the first network device, a response which carries another lightweight rekey support notification to indicate that the second network device also supports the lightweight rekey.

11. A method for rekeying a security association (SA) applied in a network system including a first network device and a second network device, comprising:
establishing an Internet Key Exchange (IKE) tunnel and an Internet Protocol Security (IPSec) tunnel between the first network device and the second network device;
negotiating to rekey a SA by:
receiving, by the second network device, a first rekey request from the first network device for rekeying a SA, wherein the first rekey request carries a first Security Parameter Index (SPI) and a cryptographic suite associated with the first network device;
determining, by the second network device, whether there is change in a cryptographic suite associated with the second network device;
sending, by the second network device, a first rekey response to the first network device, wherein the first rekey response carries a second SPI and does not carry a cryptographic suite associated with the second network device when there is no change in the cryptographic suite associated with the second network device; and
wherein:
when the SA is an IPSec SA which is a child SA of an IKE SA, the first rekey request does not carry a Traffic Selector (TS) payload carrying flow information associated with the first network device when there is no change in a flow information associated with the first network device; wherein the first rekey response does not carry a TS payload associated with the second network device when there is no change in a flow information associated with the second network device; and
the SA is rekeyed without changing flow information associated with the SA.

12. The method of claim 11, wherein the first rekey response carries a no proposal chosen notification to indicate that there is no matching cryptographic suite present in the cryptographic suite associated with the first network device carried in the first rekey request;
wherein the method further comprises renegotiating, by the second network device, with the first network device until a negotiated cryptographic suite is obtained; and
wherein the SA is rekeyed further according to the negotiated cryptographic suite.

13. The method of claim 11, wherein when the SA is an IPSec SA which is a child SA of an IKE SA, the first rekey request further carries a TS payload carrying flow information associated with the first network device when there is change in a flow information associated with the first network device; wherein the first rekey response does not carry a TS payload carrying flow information associated with the second network device when there is no change in a flow information associated with the second network device and the currently used flow information associated with the second network device is present in the flow information associated with the first network device; and
wherein the SA is rekeyed further according to the currently used flow information associated with the second network device.

14. The method of claim 11, wherein when the SA is an IPSec SA which is a child SA of an IKE SA, the first rekey request further carries a TS payload carrying flow information associated with the first network device when there is a change in a flow information associated with the first network device; wherein the first rekey response carries a TS payload carrying flow information associated with the second network device when there is change in a flow information associated with the second network device and the second network device selects flow information in the flow information associated with the first network device carried in the first rekey request as the flow information associated with the second network device;
wherein the SA is rekeyed further according to the selected flow information.

15. The method of claim 11, wherein when the SA is an IPSec SA which is a child SA of an IKE SA, the first rekey request further carries a TS payload carrying flow information associated with the first network device when there is a change in a flow information associated with the first network device; wherein the first rekey response carries a TS unacceptable notification to indicate that there is no matching flow information present in the flow information associated with the first network device carried in the first rekey request;
wherein the method further comprises:
renegotiating, by the second network device, with the first network device until a negotiated flow information is obtained; and
wherein the SA is rekeyed further according to the negotiated flow information.

16. The method of claim 11, wherein when the SA is an IPSec SA which is a child SA of an IKE SA, the first rekey request does not carry a TS payload carrying flow information associated with the first network device when there is no change in a flow information;
wherein the first rekey response carries a TS unacceptable notification when there is change in a flow information associated with the second network device;
wherein the method further comprises renegotiating, by the second network device, with the first network device until a negotiated flow information is obtained; and
wherein the SA is rekeyed further according to the negotiated flow information.

17. A first network device for rekeying a security association (SA) in a network system comprising the first network device and a second network device, the first network device comprising computer instructions that when executed by a processor, cause the first network device to:
establish an Internet Key Exchange (IKE) and an Internet Protocol Security (IPSec) tunnel are established between the first network device and the second network device; and
send, a first rekey request to the second network device for rekeying a SA, wherein the first rekey request carries a first Security Parameter Index (SPI) and a cryptographic suite associated with the first network device;

receive a first rekey response from the second network device, wherein the first rekey response carries a second SPI and does not carry a cryptographic suite associated with the second network device when there is no change in a cryptographic suite associated with the second network device;

rekeying the SA according to the first SPI and the second SPI;

wherein:
when the SA is an IPSec SA which is a child SA of an IKE SA, the first rekey request does not carry a Traffic Selector (TS) payload carrying flow information associated with the first network device when there is no change in a flow information associated with the first network device; wherein the first rekey response does not carry a TS payload associated with the second network device when there is no change in a flow information associated with the second network device; and the SA is rekeyed without changing flow information associated with the SA.

18. The first network device of claim 17, wherein when the first rekey response carries a no proposal chosen notification from the second network device when there is no matching cryptographic suite present in the cryptographic suite associated with the first network device carried in the first rekey request, the network device further configured to renegotiate with the second network device until a negotiated cryptographic suite is obtained.

19. The first network device of claim 18 is configured to send an updated cryptographic suite associated with the first network device to the second network device to negotiate with the second network device until the negotiated cryptographic suite is obtained.

20. A network device for rekeying a security association (SA) in a network system comprising a first network device and a second network device, the network device comprising computer instructions that when executed by a processor, cause the network device to operate as the second network device to:

establish an Internet Key Exchange (IKE) and an Internet Protocol Security (IPSec) tunnel between the first network device and the second network device; and receive a first rekey request from the first network device for rekeying a SA, wherein the first rekey request carries a first Security Parameter Index (SPI) and a cryptographic suite associated with the first network device;

determine whether there is change in a cryptographic suite associated with the second network device;

send a first rekey response to the first network device, wherein the first rekey response carries a second SPI and does not carry a cryptographic suite associated with the second network device when there is no change in the cryptographic suite associated with the second network device; and rekey the SA according to the first SPI and the second SPI;

wherein:
when the SA is an IPSec SA which is a child SA of an IKE SA, the first rekey request does not carry a Traffic Selector (TS) payload carrying flow information associated with the first network device when there is no change in a flow information associated with the first network device; wherein the first rekey response does not carry a TS payload associated with the second network device when there is no change in a flow information associated with the second network device; and the SA is rekeyed without changing flow information associated with the SA.

21. The network device of claim 20, wherein the first rekey response carries a no proposal chosen notification to indicate that there is no matching cryptographic suite present in the cryptographic suite associated with the first network device carried in the first rekey request;

wherein the network device further configured to renegotiate with the first network device until a negotiated cryptographic suite is obtained; and wherein the SA is rekeyed further according to the negotiated cryptographic suite.

22. The network device of claim 20, wherein when the SA is an IPSec SA which is a child SA of an IKE SA, the first rekey request further carries a TS payload carrying flow information associated with the first network device when there is change in a flow information associated with the first network device; wherein the first rekey response does not carry a TS payload carrying flow information associated with the second network device when there is no change in a flow information associated with the second network device and the currently used flow information associated with the second network device is present in the flow information associated with the first network device; and wherein the SA is rekeyed further according to the currently used flow information associated with the second network device.

23. The network device of claim 20, wherein when the SA is an IPSec SA which is a child SA of an IKE SA, the first rekey request further carries a TS payload carrying flow information associated with the first network device when there is a change in a flow information associated with the first network device; wherein the first rekey response carries a TS payload carrying flow information associated with the second network device when there is change in a flow information associated with the second network device and the second network device selects flow information in the flow information associated with the first network device carried in the first rekey request as the flow information associated with the second network device; and wherein the SA is rekeyed further according to the selected flow information.

24. The network device of claim 20, wherein when the SA is an IPSec SA which is a child SA of an IKE SA, the first rekey request further carries a TS payload carrying flow information associated with the first network device when there is a change in a flow information associated with the first network device; wherein the first rekey response carries a TS unacceptable notification to indicate that there is no matching flow information present in the flow information associated with the first network device carried in the first rekey request;

wherein the network device further configured to renegotiate with the first network device until a negotiated flow information is obtained; and wherein the SA is rekeyed further according to the negotiated flow information.

25. The network device of claim 20, wherein when the SA is an IPSec SA which is a child SA of an IKE SA, the first rekey request does not carry a TS payload carrying flow information associated with the first network device when there is no change in a flow information; wherein the first rekey response carries a TS unacceptable notification when there is change in a flow information associated with the second network device;
  wherein the network device further configured to renegotiate with the first network device until a negotiated flow information is obtained; and
  wherein the SA is rekeyed further according to the negotiated flow information.

26. A method by a first network device for rekeying a security association (SA) applied in a network system including a first network device and a second network device, the method comprising:
  establishing an Internet Key Exchange (IKE) tunnel and an Internet Protocol Security (IPSec) tunnel between the first network device and the second network device and
  sending a first rekey request to the second network device for rekeying a SA, wherein the first rekey request carries a first Security Parameter Index (SPI) and does not carry a cryptographic suite associated with the first network in the case of that there is no change in a cryptographic suite associated with the first network device;
  receiving a first rekey response from the second network device, wherein the first rekey response carries a second SPI and does not carry a cryptographic suite associated with the second in the case of there is no change in a cryptographic suite associated with the second network device;
  rekeying, by the first network device, the SA according to the first SPI and the second SPI wherein:
  when the SA is an IPSec SA which is a child SA of an IKE SA, the first rekey request does not carry a Traffic Selector (TS) payload carrying flow information associated with the first network device; wherein the first rekey response does not carry a TS payload associated with the second network device; and
  wherein rekeying, by the first network device, the SA without changing flow information associated with the SA.

27. The method of claim 26, wherein when the SA is an IPSec SA which is a child SA of an IKE SA, the first rekey request further carries a TS payload carrying flow information associated with the first network device; wherein the first rekey response does not carry a TS payload carrying flow information associated with the second network device; and
  wherein rekeying, by the first network device, the SA is further according to the flow information associated with the first network device and the currently used flow information associated with the second network device.

28. The method of claim 26, wherein when the SA is an IPSec SA which is a child SA of the IKE SA, the first rekey request further carries a TS payload carrying flow information associated with the first network device; wherein the first rekey response carries a TS payload carrying flow information associated with the second network device; and
  wherein rekeying, by the first network device, the SA is further according to the flow information associated with the first network device and the flow information associated with the second network device.

29. The method of claim 26, wherein when the SA is an IPSec SA which is a child SA of an IKE SA, the first rekey request further carries a TS payload carrying flow information associated with the first network device; wherein the first rekey response carries a TS unacceptable notification to indicate that there is no matching flow information present in the flow information associated with the first network device carried in the first rekey request;
  wherein the method further comprises:
  renegotiating, by the first network device, with the second network device until a negotiated flow information is obtained; and
  wherein rekeying, by the first network device, the SA is further according to the negotiated flow information.

30. The method of claim 26 wherein when the SA is an IPSec SA which is a child SA of an IKE SA, the first rekey request does not carry a TS payload carrying flow information associated with the first network device; wherein the first rekey response carries a TS unacceptable notification when there is change in a flow information associated with the second network device;
  wherein the method further comprises renegotiating, by the first network device, with the second network device until a negotiated flow information is obtained; and
  wherein rekeying, by the first network device, the SA is further according to the negotiated flow information.

31. The method of claim 26, wherein when the SA is an IKE SA, the first rekey request is a CREATE_CHILD_SA request for rekeying the IKE SA, the CREATE_CHILD_SA request carries a NEW_SPI notification payload carrying the first SPI or carries a Lightweight SA payload carrying the first SPI, and the first rekey response is CREATE_CHILD_SA response for rekeying the IKE SA, the CREATE_CHILD_SA response carries another NEW_SPI notification payload carrying the second SPI or carries another Lightweight SA payload carrying the second SPI; and
  wherein when the SA is an IPSec SA which is a child SA of an IKE SA, the first rekey request is CREATE_CHILD_SA request for rekeying a child SA, the CREATE_CHILD_SA request carries a NEW_SPI notification payload carrying the first SPI or carries a Lightweight SA payload carrying the first SPI, and the first rekey response is CREATE_CHILD_SA response for rekeying the child SA, the CREATE_CHILD_SA response carries the NEW_SPI notification payload carrying the second SPI or carries another Lightweight SA payload carrying the second SPI.

32. A network device operating as a first network device for rekeying a security association (SA) in a network system comprising the first network device and a second network device, the first network device the network device comprising computer instructions that when executed by a processor, cause the first network device to:
  establish an Internet Key Exchange (IKE) and an Internet Protocol Security (IPSec) tunnel between the first network device and the second network device
  send a first rekey request to the second network device for rekeying a SA, wherein the first rekey request carries a first Security Parameter Index (SPI) and does not carry a cryptographic suite associated with the first network in the case of that there is no change in a cryptographic suite associated with the first network device;
  receive a first rekey response from the second network device, wherein the first rekey response carries a second SPI and does not carry a cryptographic suite associated with the second network device in the case of there is no change in a cryptographic suite associated with the second network device;

rekey the SA according to the first SPI and the second SPI, wherein:

when the SA is an IPSec SA which is a child SA of an IKE SA, the first rekey request does not carry a Traffic Selector (TS) payload carrying flow information associated with the first network device; wherein the first rekey response does not carry a TS payload carrying flow information associated with the second network device; and rekeying, by the first network device, the SA without changing the flow information associated with the first network device and the flow information associated with the second network device.

33. The network device of claim 32 configured to send a lightweight rekey support notification to the second network device to indicate that the first network device supports for a lightweight rekey before sending the first rekey request to the second network device for rekeying the SA;

wherein the second network device is further configured to receive a response which carries another lightweight rekey support notification to indicate that the second network device also supports payload lightweight rekey.

34. A network device for rekeying a security association (SA) in a network system comprising a first network device and a second network device, an Internet Key Exchange (IKE) and an Internet Protocol Security (IPSec) tunnel are established between the first network device and the second network device, wherein the network device is configured as the second network device and comprises a receiving module, a sending module, and a rekey module; wherein:

the receiving module is configured to receive a first rekey request from the first network device for rekeying a SA, wherein the first rekey request carries a first Security Parameter Index (SPI) and does not carry a cryptographic suite associated with the first network in the case of that there is no change in a cryptographic suite associated with the first network device;

the sending module is configured to sending a first rekey response to the first network device, wherein the first rekey response carries a second SPI and does not carry a cryptographic suite associated with the second network device in the case of there is no change in a cryptographic suite associated with the second network device; and the rekey module is configured to rekey the SA according to the first SPI and the second SPI; wherein:

when the SA is an IPSec SA which is a child SA of an IKE SA, the first rekey request does not carry a Traffic Selector (TS) payload carrying flow information associated with the first network device; wherein the first rekey response does not carry a TS payload carrying flow information associated with the second network device; and rekeying, by the first network device, the SA without changing the flow information associated with the first network device and the flow information associated with the second network device.

* * * * *